US006097675A

United States Patent [19]

Takahashi et al.

[11] Patent Number: 6,097,675

[45] Date of Patent: Aug. 1, 2000

[54] ELECTRONICALLY CONTROLLED MECHANICAL TIMEPIECE

[75] Inventors: Osamu Takahashi, Matsumoto; Tatsuo Hara, Okaya; Masatoshi Moteki, Shiojiri; Eiichi Nagasaka, Minowa-machi, all of Japan

[73] Assignee: Seiko Epson Corporation, Tokyo, Japan

[21] Appl. No.: 09/161,102

[22] Filed: Sep. 25, 1998

[30] Foreign Application Priority Data

| | | | |
|---|---|---|---|
| Sep. 26, 1997 | [JP] | Japan | 9-262274 |
| Sep. 26, 1997 | [JP] | Japan | 9-262275 |
| Apr. 21, 1998 | [JP] | Japan | 10-111068 |
| Aug. 4, 1998 | [JP] | Japan | 10-220739 |

[51] Int. Cl.[7] .............................. G04B 1/00; G04C 3/00; H02K 7/10

[52] U.S. Cl. ......................... 368/204; 310/75 A; 310/156

[58] Field of Search ....................... 368/64, 66, 203–204; 310/75 R, 75 A, 156; 320/2, 20, 21

[56] References Cited

U.S. PATENT DOCUMENTS

| | | | |
|---|---|---|---|
| 3,432,735 | 3/1969 | Petrides . | |
| 4,939,707 | 7/1990 | Nagao | 368/64 |
| 5,532,982 | 7/1996 | Beguin et al. | 368/64 |
| 5,684,761 | 11/1997 | Chen et al. | 368/204 |
| 5,740,131 | 4/1998 | Bernasconi | 368/204 |
| 5,751,666 | 5/1998 | Fasine et al. | 368/204 |
| 5,835,456 | 11/1998 | Farine et al. | 368/66 |
| 5,923,619 | 7/1999 | Knaden et al. | 368/64 |

FOREIGN PATENT DOCUMENTS

| | | |
|---|---|---|
| 0 239 820 | 10/1987 | European Pat. Off. . |
| 0 679 969 | 11/1995 | European Pat. Off. . |
| 2 464 516 | 8/1979 | France . |
| 55-5089 | 1/1980 | Japan . |
| 7-119812 | 11/1987 | Japan . |
| 8-101284 | 4/1996 | Japan . |
| 98/27473 | 6/1998 | WIPO . |
| WO 98/27473 | 6/1998 | WIPO . |

*Primary Examiner*—Vit Miska
*Attorney, Agent, or Firm*—Stroock & Stroock & Lavan LLP

[57] ABSTRACT

A generator of an electronically controlled mechanical timepiece comprises a mechanical energy source, a generator, a train wheel and an electronic circuit. The train wheel connects the mechanical energy source and the generator. The generator includes a rotor, a first plate-shaped stator, a second plate-shaped stator, a pair of semi-circular stator holes and at least a first coil.

13 Claims, 18 Drawing Sheets

(Waveform of power generated by the present invention)
Time (Waveform of conventional generated power)
Time

ELECTRONICALLY CONTROLLED MECHANICAL TIMEPIECE

BACKGROUND OF THE INVENTION

The present invention relates generally to an electronically controlled mechanical timepiece which is operated using mechanical energy generated when a mainspring is released as a drive source and, in particular, to an improvement in the generator of the timepiece which converts mechanical energy into electrical energy and uses the output electrical energy to control power generation.

Generally, the principle utilized for driving an electronically controlled mechanical timepiece involves a generator connected to a train wheel. The train wheel is driven using a mainspring as an energy source. The generator generates power by receiving rotation from the train wheel. The speed at which the generator operates is controlled by a mechanical speed control mechanism such as a timed annular balance and escape wheel. However, it is known that the generator can be utilized in place of a mechanical speed control mechanism composed of a timed annular balance and an escape wheel which are inherent to the mechanical timepiece.

An electronic control circuit can be used to control the speed and is driven by the power generated by the generator. The rotation cycle of the generator is controlled in response to a control signal from the electronic circuit. The speed of the train wheel is controlled by applying a brake to the train wheel. Consequently, a battery acting as a drive source of the electronic circuit is not necessary in this structure. Furthermore, a pinpoint accuracy, similar to that of a battery-driven electronic clock, can be obtained.

Unexamined Japanese Patent Publication No. 8-5758 discloses as prior art this type of hybrid type timepiece which was previously developed by the applicant. Reference is made to FIG. 16 in which an example of such a prior art electronically controlled mechanical timepiece is shown. Reference is made to FIG. 17 which depicts an exploded perspective view of a generator 20 used in the timepiece of FIG. 16.

The prior art electronically controlled mechanical timepiece includes a movement barrel 1 composed of a mainspring, a barrel gear, a barrel arbor and a barrel lid. The mainspring has an external end fixed to the barrel gear and an internal end fixed to the barrel arbor. The barrel arbor is supported by a main plate and a train wheel bridge and is fixed by a ratchet wheel screw 5 so that it is rotated integrally with a ratchet wheel 4. Ratchet wheel 4 is meshed with a pawl 6 so that it rotates clockwise and is prevented from rotating in a counterclockwise direction.

The rotational speed, (i.e. the power) from movement barrel 1 containing the mainspring is increased through the train wheel which composed of a second wheel 7, a third wheel 8, a fourth wheel 9, a fifth wheel 10 and a sixth wheel 11. The resultant rotational power is supplied to generator 20.

Generator 20 has a structure similar to a step motor for driving a conventional battery-drive-type electronic clock. Generator 20 is composed of a rotor 12, a stator 15 and a coil block 16.

Rotor 12 is composed of a rotor pinion 12*a*, a rotor magnet 12*b* and a rotor inertia disc 12*c*. Rotor magnet 12*b* and rotor inertia disc 12*c* are integrally attached around rotor pinion 12*a*. Rotor pinion 12*a* is rotated by being connected to sixth wheel 11.

A stator coil 15*a* is wound around the periphery of stator 15. Stator 15 has a stator hole 15*b* at an extreme end of stator 15 for rotatably accommodating rotor magnet 12*b*. A pair of external notches 15*c* are formed in stator 15. External notches 15*c* are formed at intervals of 180° around the periphery of stator hole 15*b* and are located at the top and bottom tip of stator hole 15*b*. External notches 15*c* are recessed toward stator hole 15*b*. The opposite end of the stator 15 is fixed to a main plate not shown by a screw 21.

Coil block 16 is composed of a magnetic core 16*a* and a coil 16*b*. Coil 16*b* is wound around magnetic core 16*a*. Both the ends of coil block 16 overlap both the ends of stator 15 when mounted to the main plate and are tightened together by a pair of screws 21 and integrally fixed to the main plate. Stator 15 and magnetic core 16*a* are made of a PC Permalloy material. Stator coil 15*a* is connected in series to coil 16*b* to provide an output voltage obtained by adding the voltages generated by stator coil 15*a* and coil 16*b*.

Generator 20 supplies the power obtained by the rotation of rotor 12 to an electronic circuit having a crystal oscillator through a capacitor (not shown). The electronic circuit detects the number of rotations of rotor 12 and supplies a rotor rotation control signal to the coils in accordance with a reference frequency to brake the generator. As a result, the train wheel is rotated at a constant rotational speed at all times in accordance with a braking force applied thereto. However, generator 20 having the above described structure has a problem in its structure and a problem in electromagnetic characteristics.

Generator 20 follows the structure of the conventional step motor. Generator 20 is additionally provided with coil block 16 in order to advantageously generate power while avoiding scramble for other parts such as the train wheel and the like, that is, in order to increase the number of turns of the coil as much as possible.

As a result, stator hole 15*b* is formed to have a cantilever support structure as shown in the FIG. 16. This structure causes an electromagnetic problem which is not seen in the conventional step motor.

First, since stator hole 15*b* is formed integrally with stator 15 by stamping or the like, a flux passes through external notches 15*c*. When rotor magnet 12*b* of rotor 12 passes external notches 15*c*, the fluxes of the coils do not change although the fluxes of external notches 15*c* change. Consequently, a voltage generated is dropped at the positions where rotor magnet 12*b* passes.

As a countermeasure for preventing the above problem, the width of the external notches 15*c* is sufficiently reduced in a manufacturing process to thereby decrease an amount of drop in the voltage.

However, when this countermeasure is employed, stator hole 15*b* is liable to be deformed even by a slight amount of external force applied thereto while it is processed or in a following process such as winding, annealing and the like. Accordingly, performance is varied by the change of the diameter of the stator hole 15*b* or the deformation thereof and cogging torque is increased, the reby decreasing the efficiency as a generator.

A simple method of detecting the number of rotations of a rotor is to detect the waveform of generated power and convert it to a binary value. However, since the generated voltage is actually dropped at the notch passing-through positions as described above, the waveform is made to a complex mountain-shaped waveform as shown in FIG. 18(*b*) and therefore it is difficult to detect the waveform.

Further, a finished product is finally attached to the main plate by screws in combination with coil block 16. However, since the coils are heavy, the portion of stator 15 located on the opposite side from external notches 15*c* is liable to be bent or deformed easily even if a very slight force is applied thereto and therefore careful caution is required in the handling of stator 15. A resultant product which has been deformed as described above is disposed of as a defective product in an inspection process. This leads to a reduction of yields which cannot be avoided in respective processes from the structure of the product.

The present inventions is directed at overcoming inadequacies in the prior art.

An object of the present invention is to provide an improved electronically controlled mechanical timepiece which can solve a problem in handling and improve yields as well as increase a generated voltage at the same time by dividing a stator hole into two sections and easily detect a number of rotations by making the waveform of the generated power to a sine wave.

SUMMARY OF THE INVENTION

Generally speaking, in accordance with the present invention, an electronically controlled mechanical timepiece includes a main spring as an energy source. A drive train wheel is coupled to the main spring and rotates as the main spring releases energy and a generator. The generator has a rotor rotating in association with the rotation of a train wheel to generate power. The generator also includes two plate-shaped stators. A pair of semi-circular stator holes are formed at respective ends of the two stators and disposed around the rotor in the form of a circle such that both the stators are combined. A coil is wound around the periphery of at least one of the stators. An electronic circuit receives the power generated by the generator and applies a brake to the train wheel and regulates the speed thereof by controlling the rotation cycle of the generator.

The division of the stator holes into the two sections helps in preventing difficulty in handling of the generator. Additionally, the drop in yield because of the defect of a conventional single stator hole caused by the provision of external notches is also prevented. In addition, the generated voltage is increased and thus the waveform of the voltage is converted to a sine wave which makes it easier to detect rotation.

It is advantageous to the generator to wind coils around the peripheries of both the stators and connect the coils in series to each other, because by increasing the number of turns of the coils, generated voltage can be increased.

Sometimes, the coils wound around the periphery of the stator may generate electromotive force as well as control rotation. In this case, the number of wiring connected to the coil can be reduced.

At least two coils may be wound around the peripheries of the stators. At least one of the coils may used to control rotation and at least one of the other coils may be used to generate electromotive force to be supplied to the electronic circuit.

When a plurality of coils are provided, the functions of the respective coils are perfectly distinct to the function for controlling rotation and the function for generating an electromotive force. Thus, the generated voltage is not dropped by the application of an electromagnetic brake, the voltage is stabilized and the disturbance of the waveform of the voltage can be suppressed.

It is preferable that at least one of the coils used to generate the electromotive force also detects the rotation of the rotor. In this case, since the disturbance of the waveform of the voltage of the coil can be eliminated, the rotation cycle of the rotor can be easily detected.

It is preferable to provide a positioning member capable of being abutted against the edges of the stators on the sides of the stator hole, and positioning jigs for pressing and abutting the stators against the positioning member. When a pair of stator holes are formed by two stators, a gap between the two stators and a rotor magnet must be uniformly set. When the gap is dispersed, cogging torque is increased and the number of fluxes flowing through a coil is changed by a rotor which is strongly pulled to one of the stators. Accordingly, the amount of power generated and the torque for rotating a generator are not stabilized. Positioning the stators while measuring the gap between the stators and the rotor slows the work in the assembly line. Alternatively, the provision of the positioning jigs as mentioned above permit the stators to be correctly and easily positioned in a state such that the rotor is interposed between the stators.

It is preferable that the positioning jigs have inclined surfaces obliquely pressed against the edges of the stators so that the stators are positioned in a height direction by the inclined surfaces. In this case, the positioning jigs allow for the easy positioning of the stators in a diameter direction and also allow for the easy positioning of the stators in a sectional direction.

The stators may be symmetrically disposed with respect to the right side and the left side. Thus, the right and left parts (stators) can be commonly used, thereby reducing the cost.

In a preferred embodiment the same number of turns of coils are wound around both the stators. With this arrangement, since the same number of fluxes due to AC noise and the like generated externally of the clock can flow between the two coils, the affect of external noise can be eliminated and the detecting performance is improved.

In another preferred embodiment an internal notch projecting toward the outside to at least one of confronting positions of the inner peripheries of the stator holes is formed so as to regulate cogging torque. The formation of the internal notch lowers the cogging torque when the magnetic pole of the rotor passes through the position of the notch, thereby making the rotation of the rotor smoother.

In another preferred embodiment the sides of the other ends of the stators which are opposite to the ends where the stator holes are formed are abutted against each other, and the lower surfaces of the other ends are abutted against a yoke disposed across the stators. With this arrangement, two magnetic conducting paths can be formed. A first path passing through the portion where the sides of the stators are in contact with each other and a second path ranging from the lower surface of one of the stators to the lower surface of the other passing through the yoke. Although a flux is liable to flow in the side direction of the stators, when the magnetic conducting path is formed only by the portion where the sides of the stators are in contact with each other, magnetic resistance is dispersed by the dispersion of a gap between the sides. Accordingly, the additional magnetic conducting path formed by disposing the yoke on the lower surfaces of the stators can stabilize the magnetic resistance.

Further, the wheels constituting the train wheel may be disposed on a different axial line so that they are disposed at positions where they do not overlap the coil. When the respective wheels constituting the train wheel are disposed on a different axial line, the degree of freedom of the disposition of the wheels can be increased in design. As a result, when the wheels are disposed so as to be roundabout toward the rotor, the wheels can be disposed at positions where they do not overlap the coils. Accordingly, since the number of turns can be increased by increasing the diameter of the coils, the length of the coils in an axial direction, that is, the length of a magnetic path can be reduced, whereby the duration of the mainspring can be increased by reducing iron loss.

Accordingly, it is an object of this invention to provide an improved electronically controlled mechanical timepiece.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
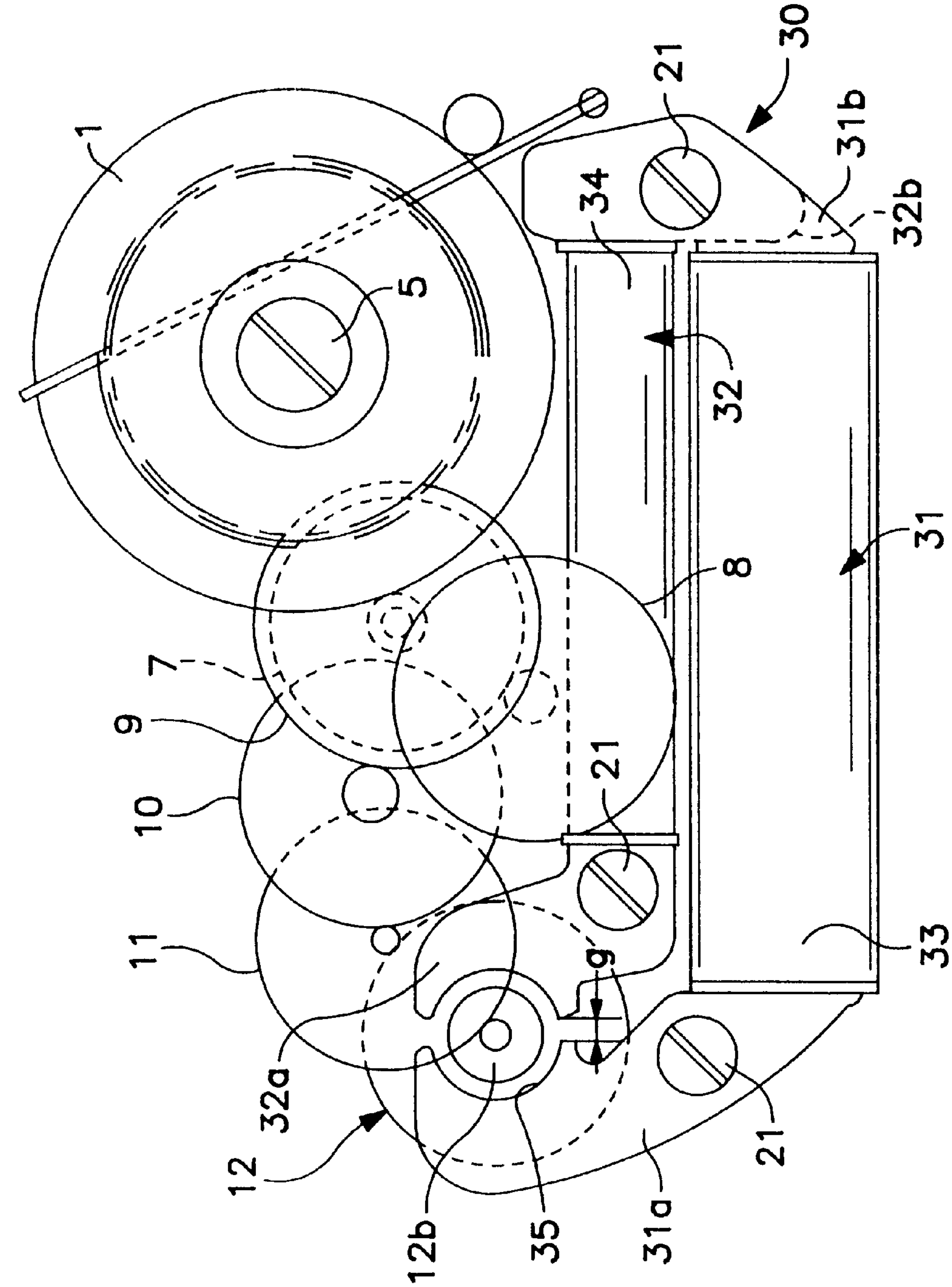
FIG. 1 is a plan view of an electronically controlled mechanical timepiece constructed in accordance with a first embodiment of the present invention.
Figure 2:
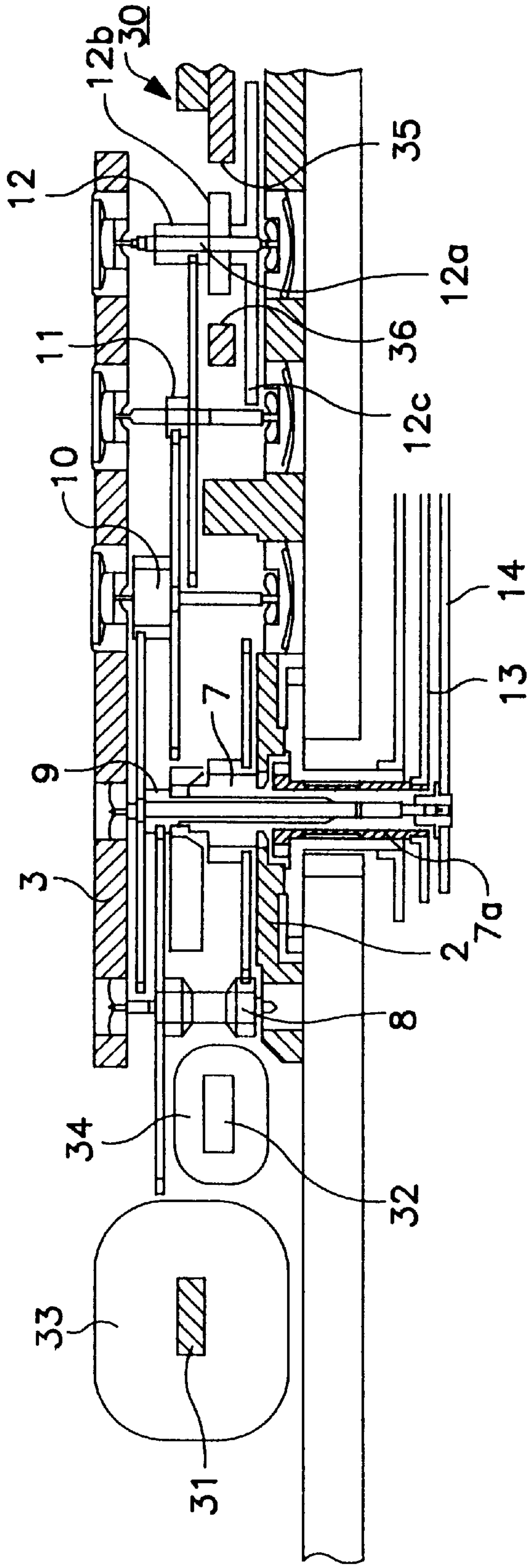
FIG. 2 is a sectional view of a mechanical time piece constructed in accordance with the first embodiment of the invention.
Figure 3:
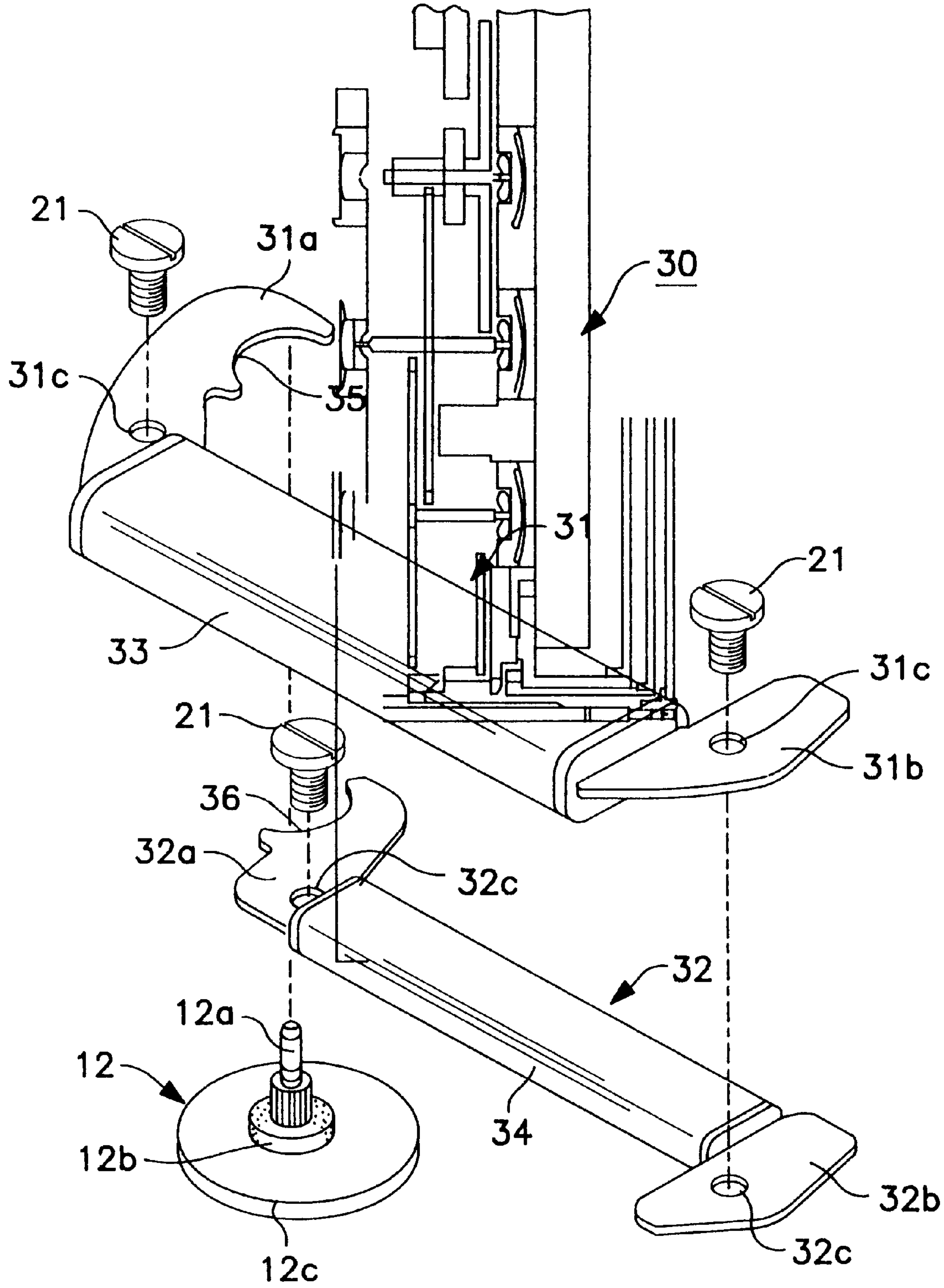
FIG. 3 is an exploded perspective view of a generator constructed in accordance with the first embodiment of the invention.

Reference is first made to FIG. 1–FIG. 3 in which an electronically controlled mechanical timepiece constructed in accordance with a first embodiment of the present invention is provided. The electronically controlled mechanical timepiece of FIG. 1 is depicted similarly to the conventional electronically controlled mechanical timepiece of FIG. 16. The main difference is that the construction of a main portion of the generator of the present invention is different from that of the generator of the conventional timepiece. Thus, the same or corresponding parts in the figures of the present invention are denoted by the same numerals as used in connection with the prior art and only different parts or newly added or described parts are denoted by different numerals.

As shown in FIG. 1, the clock of the present invention includes a mainplate 2 and a train wheel bridge 3. Barrel 1 and gear train wheels 7–11 are supported between mainplate 2 and train wheel bridge 3 and are arranged such that the rotational power from a movement barrel 1 is supplied to a generator 30 after its speed is increased through a gear train wheel 7–11.

Specifically, the rotation of a gear of movement barrel 1 is stepped up in speed by a factor of seven and transmitted to a second wheel 7 and thereafter sequentially stepped up by a factor of 6.4 and transmitted to a third wheel 8, stepped up by a factor of 9.375 and transmitted to a fourth wheel 9, stepped up by a factor of 10 and transmitted to a sixth wheel 11, stepped up by a factor of ten and transmitted to a rotor 12 of generator 30. Through these step-up train wheels 7 through 11, the rotational speed of the gear of movement barrel 1 is increased by a factor of 126,000.

Referring to FIG. 2, second wheel 7 includes a canon pinion 7*a*. A minute hand 13 is affixed to canon pinion 7*a*. A second hand 14 is affixed to fourth wheel 9. To rotate the second wheel 7 at 1 rpm and the fourth wheel 9 at 1 rpm, rotor 12 must be controlled to rotate at 5 rpm.

Rotor 12 of generator 30 is arranged in a manner that is similar to a conventional rotor. However, although a stator is disposed on main plate 2 like the stator of a conventional generator, the stator of the present invention is composed of a combination of a wide stator 31 corresponding to the magnetic core of a coil block and a narrow stator 32, as shown in FIG. 1 and FIG. 3. A coil 33 is wound around stators 31 and a coil 34 is wound around stator 32. Coil 33 is connected in series to coil 34.

Semi-circular stator holes 35, 36 are formed in respective extreme ends 31*a*, 32*a* of stators 31, 32. When assembled, semicircular holes 35, 36 are in confrontation with each other at the positions where an extreme end 31 a of stator 31 confronts an extreme end 32*a* of stator 32. A rotor magnet 12*b* is rotatably accommodated within an opening formed by semi-circular stator holes 35, 36. Further, inserting holes 31*c*, 32*c* are individually formed on extreme ends 31*a*, 32*a* such that screws 21 can be inserted therethrough in order to affix extreme ends 31*a*, 32*a* to main plate 2.

Rear end 31*b* of stator 31 and rear end 32*b* of stator 32 are formed such that they overlap thereby stator 31 to stator 32 to form a magnetic path. Rear ends 31*b*, 32*b* have inserting holes (screw holes) 31*c*, 32*c* defined at the center of the overlapped portions which an be used to affix rear end 31*b*, rear end 32*b* to main plate 2 via a common screw 21.

Therefore, when stators 31, 32 are arranged as described above, stator holes 35, 36 surround the periphery of rotor magnet 12*b* in such a way that they are separated from each other by a gap g as shown in FIG. 1.

Figure 4:
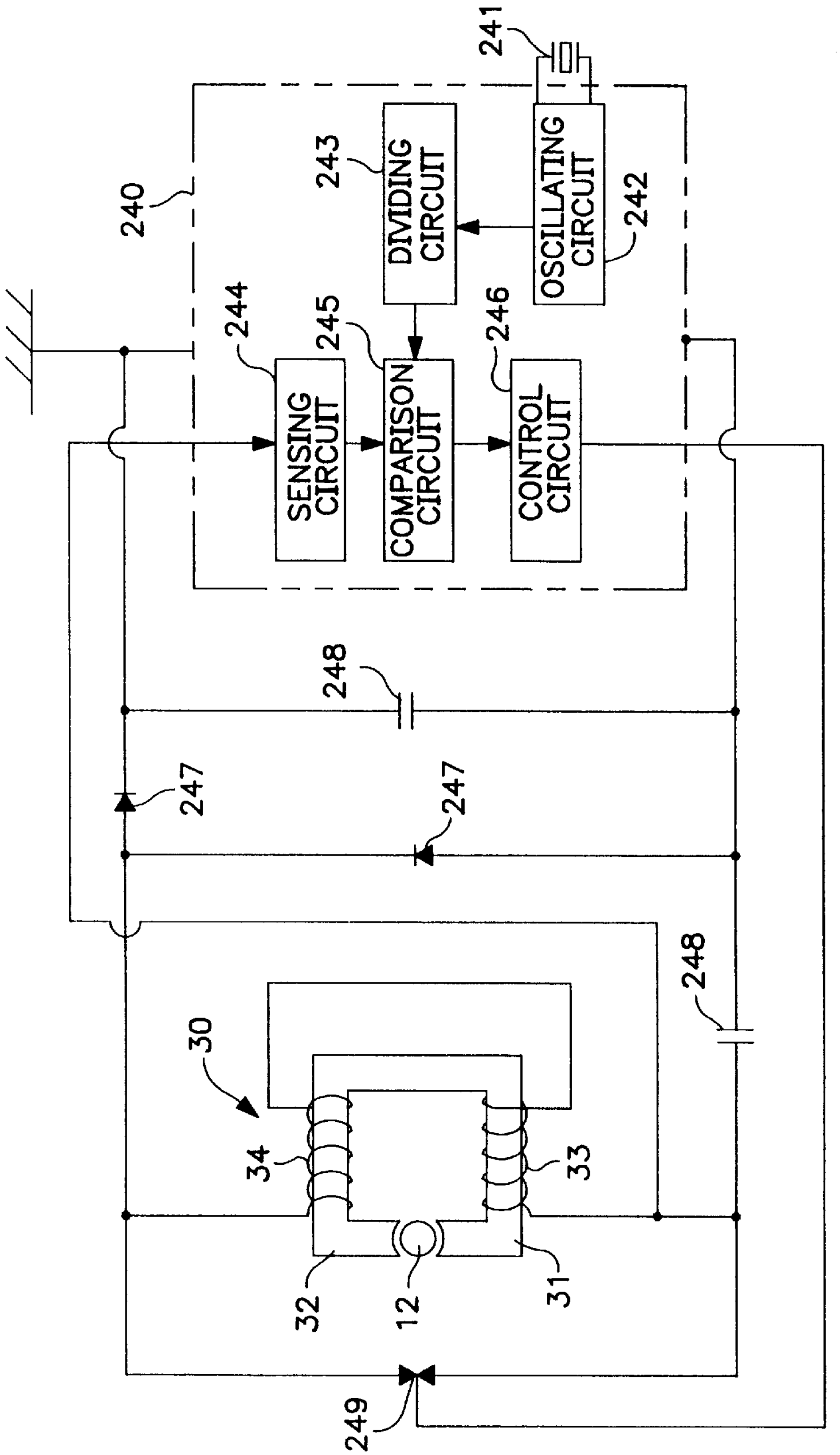
FIG. 4 is a circuit block diagram showing the connection of the generator to an electronic circuit constructed in accordance with the invention.

Coils 33, 34 are connected in series to each other and are used to generate electromotive force, detect the rotation of rotor 12 and control the rotation of rotor 12, i.e. generator 30. Specifically, an electronic circuit 240 (FIG. 4) composed of an IC is driven by the electromotive force of coils 33, 34 and can detect the rotation of rotor 12 and control the rotation of rotor 12. Electronic circuit 240 includes an oscillating circuit 242 for driving a quartz oscillator 241. The clock signal of oscillating circuit 242 is input to a dividing circuit 243 for producing a reference frequency signal serving as a time signal based on a clock signal generated by oscillating circuit 242. A sensing circuit 244 coupled to coil 33 detects the rotation of rotor 12 and outputs a rotation cycle signal. A comparison circuit 245 compares a rotation cycle obtained by sensing circuit 244 with the reference frequency signal and outputs a difference therebetween. A control circuit 246 receives the difference and transmits a control signal to generator 30 in accordance with the difference. The clock signal may be generated using various types of reference standard oscillation sources in place of quartz oscillator 241.

Circuits 242–246 are driven by the power generated from coils 33, 34. When rotor 12 of generator 30 is rotated by the train wheel in one direction, an AC output is generated by coils 33, 34. Diodes 247 and capacitors 248, forming a boosting/charging circuit, are coupled to coils 33, 34 to boost and rectify the output. Control circuit (electronic circuit) 240 is driven by the rectified DC current.

Part of the AC output from coils 33, 34 is taken out as a signal for detecting the rotation cycle of rotor 12 and input to sensing circuit 244. An output waveform output from coils 33, 34 draws a correct sine wave for each single rotation of rotor 12. Therefore, sensing circuit 244 subjects the signal to A/D conversion and arranges it as a time series pulse signal. Comparison circuit 245 compares the detected signal with the reference frequency signal and control circuit 246 transmits a control signal to a short-circuit circuit 249 which acts as a brake circuit of the coils 33, 34 in accordance with the difference between the detected signal and the reference frequency signal.

A Short-circuit 249 coupled between coils 33, 34 short-circuits both the ends of coils 33, 34 based on the control signal from control circuit 246 applying a short-circuit brake to rotor 12 thereby controlling the rotation cycle of rotor 12.

Figure 5:
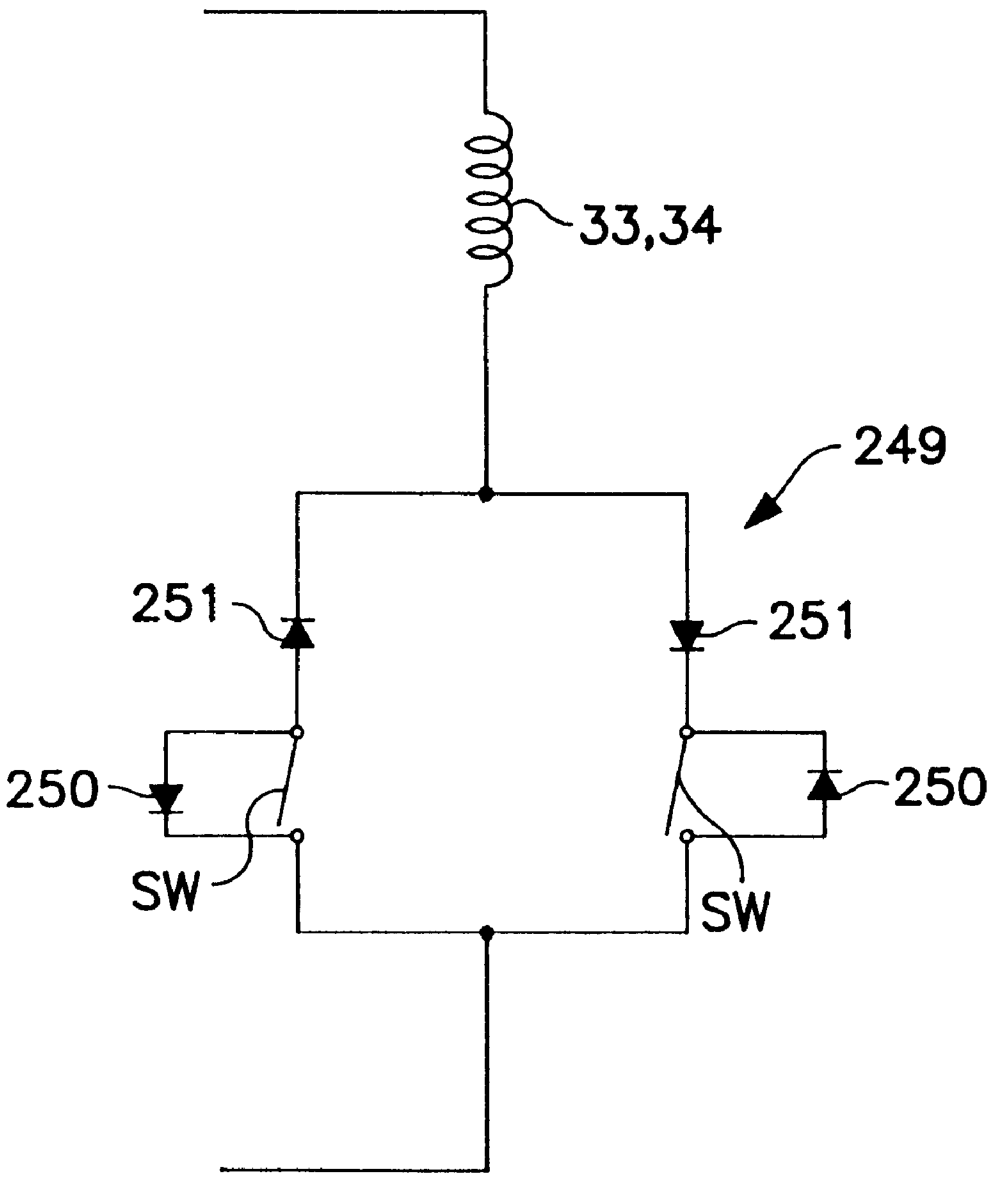
FIG. 5 is a circuit diagram showing a short-circuiting switch constructed in accordance with one embodiment of the invention.

Reference is now made to FIG. 5, which illustrates one embodiment of short-circuit circuit 249. Circuit 249 includes a two-way switch composed of a pair of diodes 251 coupled in opposite directions to ends of coils 33, 34 which cause a current to pass therethrough in opposite directions. Respective switches SW are connected in parallel to diodes 250, 251. Each switch SW is connected in series with a respective diode 250, 251. With this arrangement, the amount of breaking can be increased by using the full wave of the AC output from coils 33, 34.

Figure 16:
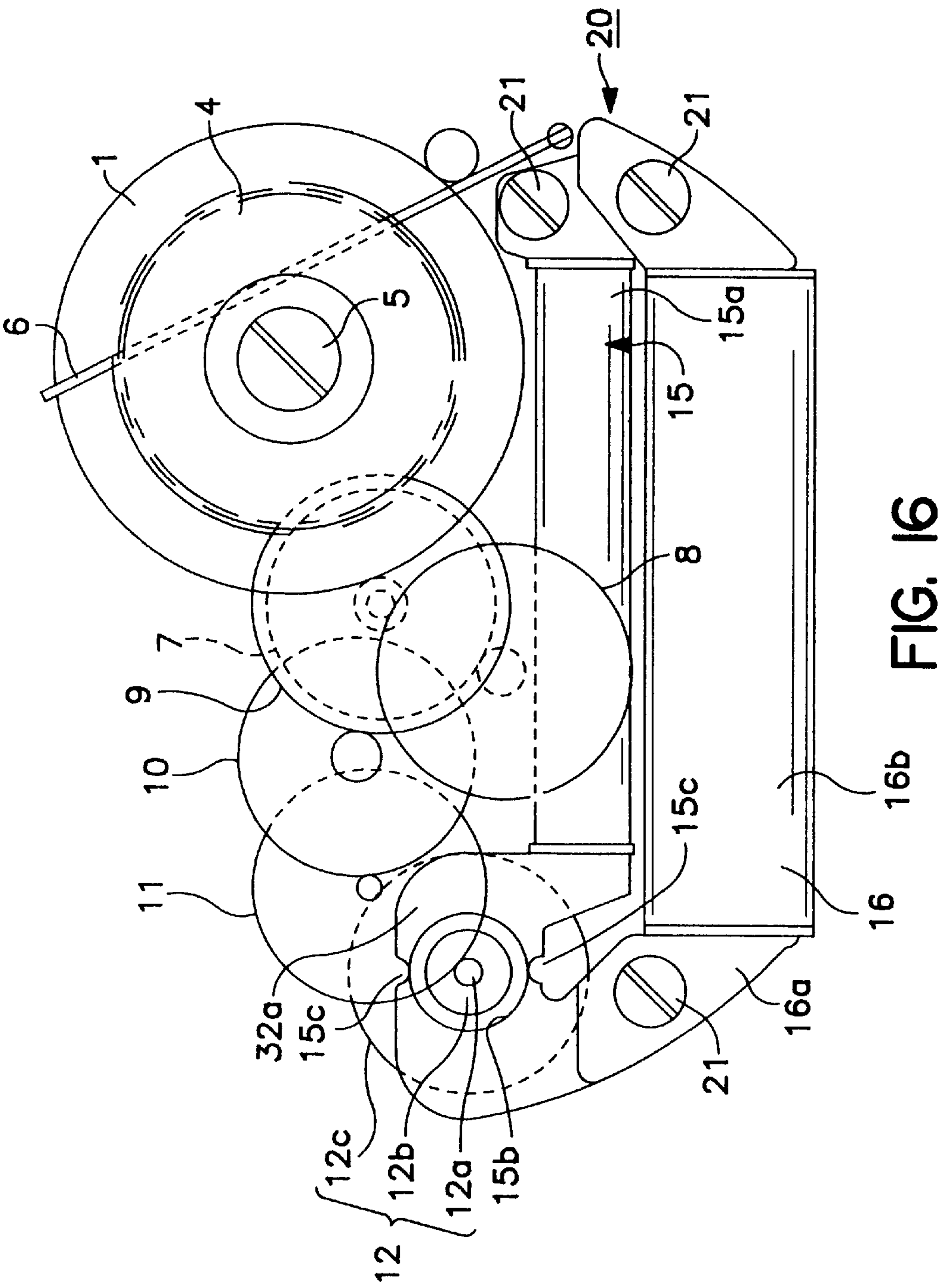
FIG. 16 PRIOR ART
FIG. 16 is a plan view of an electronically controlled mechanical timepiece constructed in accordance with the prior art including a conventional generator.
Figure 17:
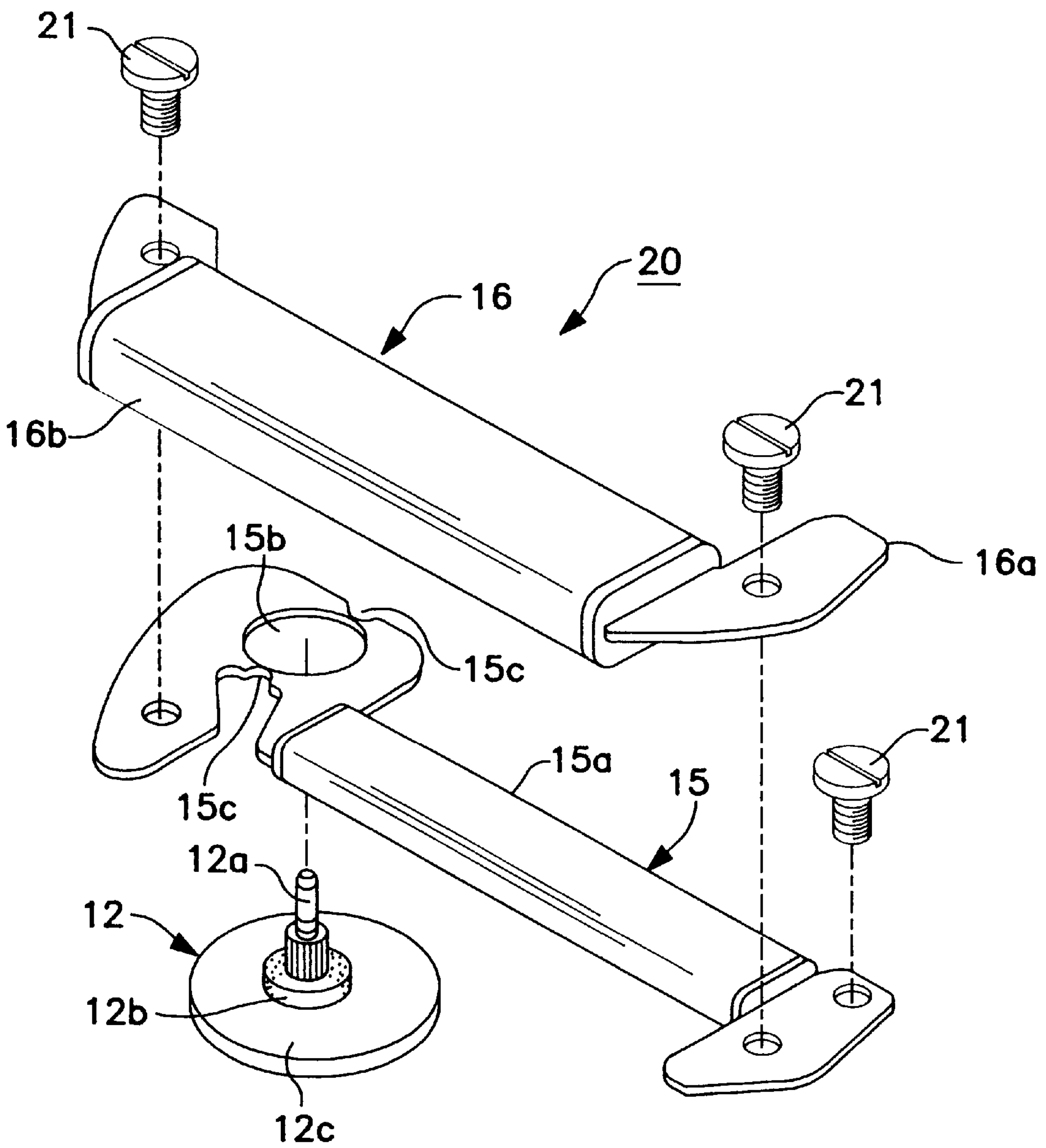
FIG. 17 PRIOR ART
FIG. 17 is an exploded perspective view of a generator constructed in accordance with the prior art.
Figure 18A:
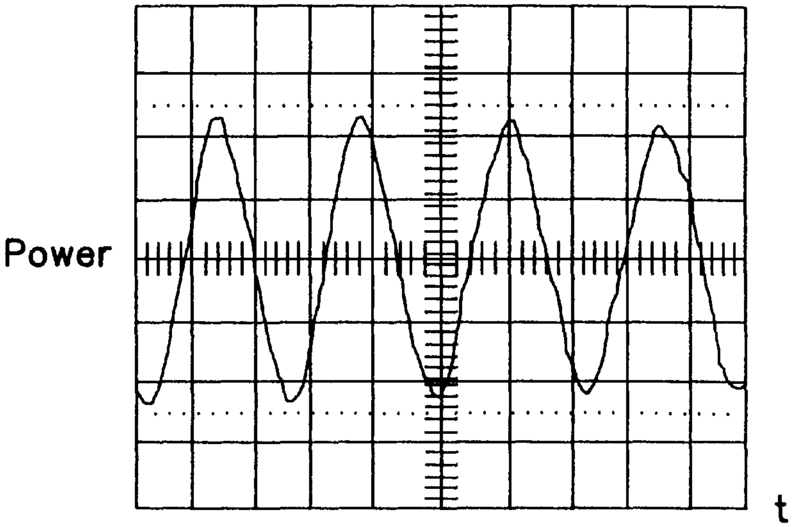
FIG. 18A PRIOR ART
FIG. 18A is a graph showing a voltage waveform of the generator of the present invention.
Figure 18B:
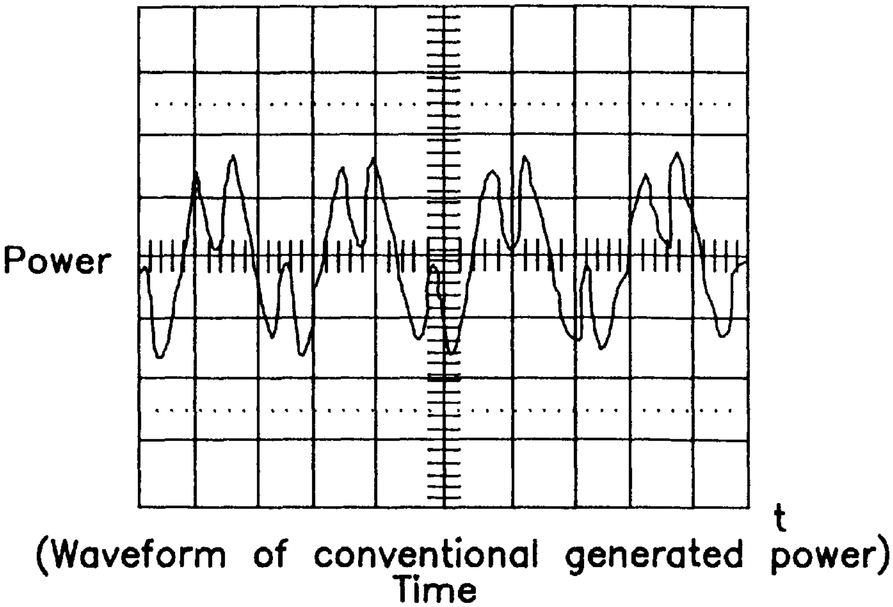
FIG. 18B PRIOR ART
FIG. 18B is a graph showing a voltage waveform output by the conventional generator of the prior art.

Reference is now made to FIG. 18(*a*), which shows the power generating characteristics of generator 30 arranged as described above, wherein the dimension, number of turns and the like of coils 33, 34 of generator 30 are the same as those of the conventional generator shown in FIG. 16 and FIG. 17. FIG. 18(*a*) depicts the results of measurement obtained by connecting the output ends of coils 33, 34 to an oscilloscope. A less complex sine wave is produced. This embodiment of the present invention provides for the following advantageous effects:

1) The use of two stators 31, 32, helps provide an increased generated voltage as compared with a case provided with conventional external notches. Further, the output waveform can be made to a correct sine wave for each cycle as compared with a conventional output waveform (see FIG. 18(*b*)), wherein the output waveform is an incorrect or more complex sine wave.

As a result, the generating capability of generator 30 can be improved and the size of generator 30 need not be increased to obtain the same voltage as that of a conventional generator or the size may even be reduced to obtain the same voltage output by the conventional generator. Further, since the output waveform is made to a sine wave, the output waveform can be easily detected by converting it to a binary value by dividing it by a proper threshold value. Thus, the number of rotations and the like of rotor 12 can be easily detected. Consequently, the clock making use of the output waveform of generator 30 can be correctly and simply controlled.

2) Stators 31, 32 do not have a fragile portion made by a cantilevered stator hole or the like and a portion which is liable to be deformed such as the external notches in the prior art. Thus, stators 31, 32 are simpler to handle and consequently a drop in yields on the assembly line and elsewhere can be prevented.

3) Since stators 31, 32 are fixed by screws 21 in the vicinity of stator holes 35, 36, the stator holes 35, 36 can be accurately positioned with respect to rotor 12.

4) Rear ends 31*b*, 32*b* of stators 31, 32 are directly connected to each other by screw 21. Thus, an annular loop through which a flux flows can be formed only by stators 31, 32. As a result, the flux easily flows by as a result of reducing the number of contacts. Furthermore, the number of parts can be decreased.

5) Since short-circuit circuit 249 connected to coils 33, 34 is composed of a two-way switch, the braking amount can be increased by making use of the full wave, and thus the brake control can be effectively carried out.

Figure 6:
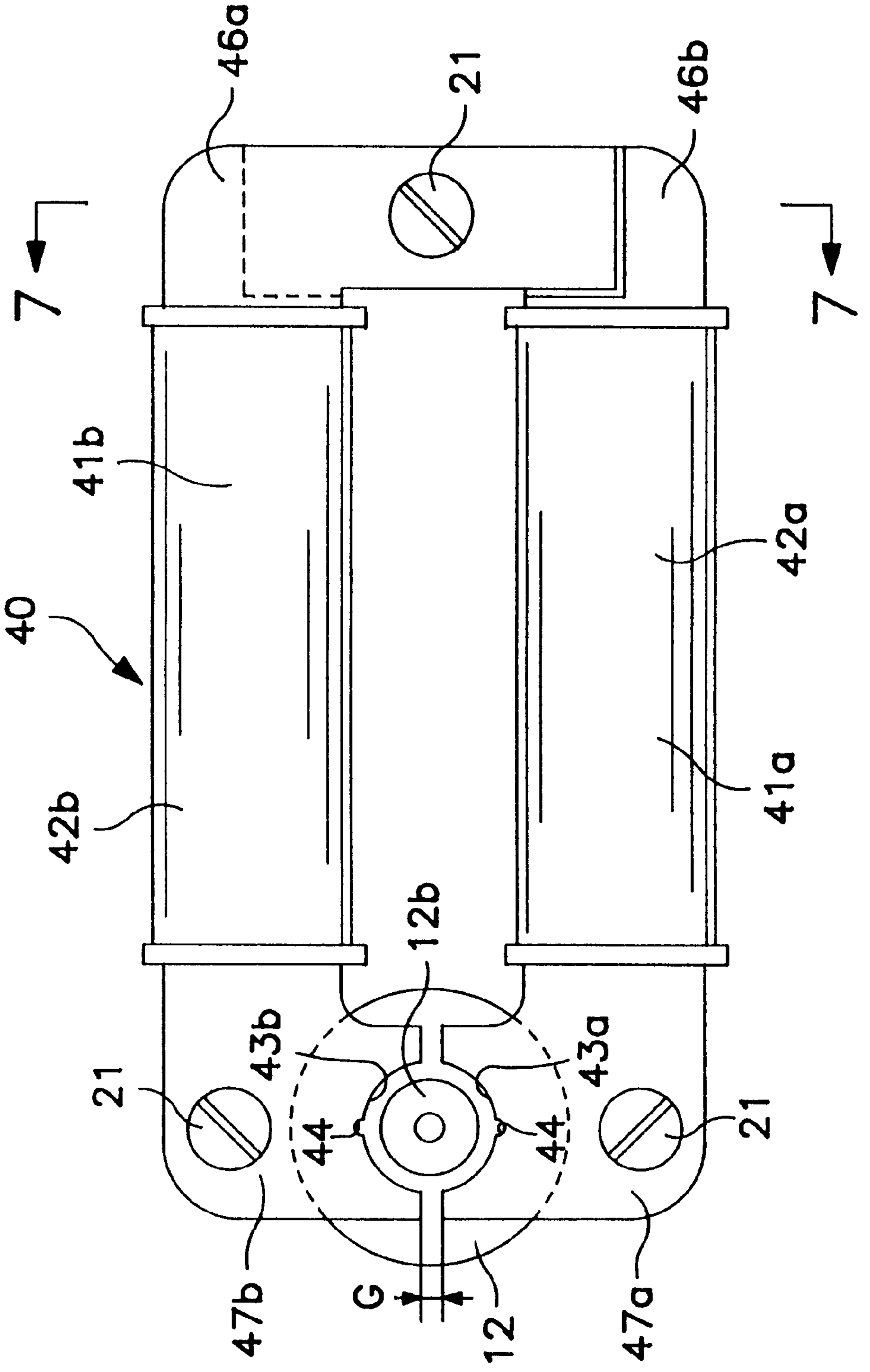
FIG. 6 is a plan view of a generator constructed in accordance with a second embodiment of the present invention.
Figure 7:
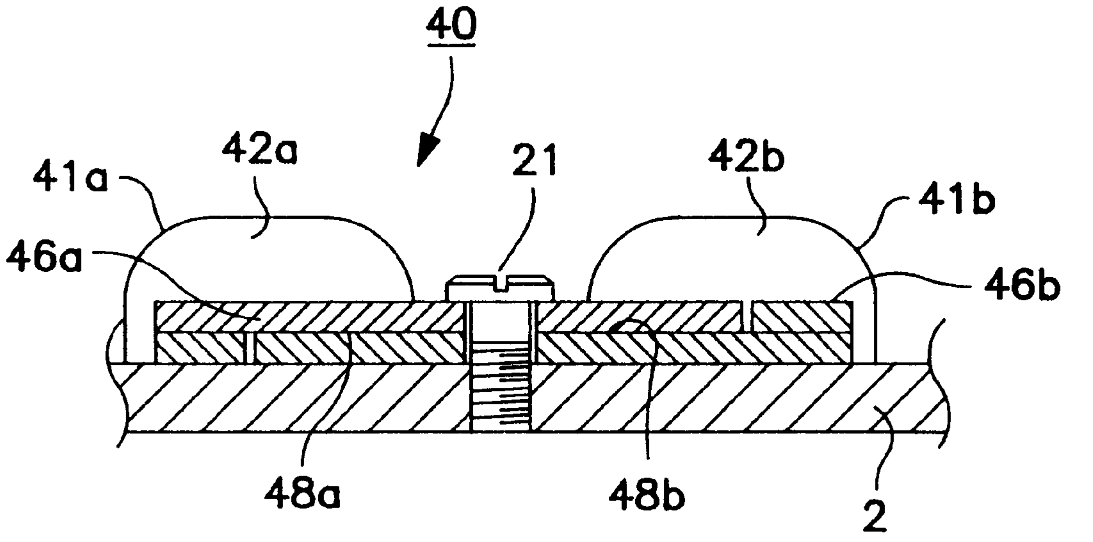
FIG. 7 is a sectional view taken along the line 7—7 of FIG. 6.

Reference is now made to FIG. 6 and FIG. 7 which show a second embodiment of the present invention. Again, like numbers are utilized to indicate like structure. A generator 40 is composed of a pair of C-shaped stators 41*a*, 41*b* formed to the same shape and coils 42*a*, 42*b* wound around the peripheries of respective stators 41*a*, 41*b*. Coils 42*a*, 42*b* have the same number of turns and are connected in series to each other. Extreme ends 47(*a*), 47*b* having semi-circular stator holes 43*a*, 43*b* are formed in confrontation with each other across gaps G defined therebetween when affixed to the main plate.

In addition to the above, both stator holes 43*a*, 43*b* have internal notches 44*a*, 44*b* which serve as recesses for regulating cogging torque. Internal notches 44*a*, 44*b* are formed toward the outside of semicircular stator holes 43*a*, 43*b* separated by 180 degrees and at the positions thereof which are turned 90 degrees from the positions of the gaps. Extreme ends 41*a* are individually fixed to a main plate 2 by screws 21.

Stators 41*a*, 41*b* are arranged as a two-sheet-laminating type. Specifically, the laminating portions of the rear ends 46*a* of stators 41 are cutout and stepped portions 48*a*, 48*b* are formed thereto so that rear ends 41*b* can be made flat when they are laminated. Further, rear ends 46*a*, 46*b* are fixed to main plate 2 by screw 21 which passes therethrough.

Coils 43 have the same number of turns. However, since the number of turns of a coil is usually a unit of several tens of thousands of turns, the same number of turns includes not only a case that the number of turns is perfectly the same but also a case having an error of turns which is negligible from the coils as a whole, for example, several hundreds of turns. The second embodiment of the present invention is also provided with an electronic circuit and the like similar to those of the first embodiment to detect rotation and control rotation.

In addition to effects similar to effects 1)–5) of the first embodiment, the second embodiment provides the following advantageous effects.

6) Stators 41 have the same shape. Thus, the same parts can be commonly used by reversing the front side and back side. Consequently, the number of parts can be reduced. Thus, manufacturing costs and part costs can be reduced. The reduction in the number of parts makes for easier handling of the parts.

7) Stators 41 have the same shape and are symmetrically disposed on the right side and left side. Stators 41 also have the same number of turns of coils 42 wound around stators 41. Thus, the same amount of flux resulting from AC noise and the like which are caused externally of the clock, flow in coils 42. Consequently, the affect of external noise can be cancelled by the fluxes. As a result, an electronically controlled mechanical timepiece which is resistive to noise can be formed.

8) Internal notches 44 are formed in stators 41. Thus, the cogging torque of rotor magnet 12*b* passing therethrough is reduced, which results in a smoother rotation of rotor 12. In particular, since the magnetic pole of rotor magnet 12*b* is liable to be stopped in the directions 90° turned from the gaps, the formation of internal notches 44 in the above positions can effectively reduce the cogging torque by canceling the torque which makes rotor magnet 12*b* liable to stop in the direction of the gap.

9) Stators 41 are arranged as the two-sheet-laminating type and directly connected to each other. Thus, leakage flux is reduced as well since stepped portions can be formed to the laminating portions. Moreover, positioning can be conveniently carried out in the assembly line.

Figure 8:
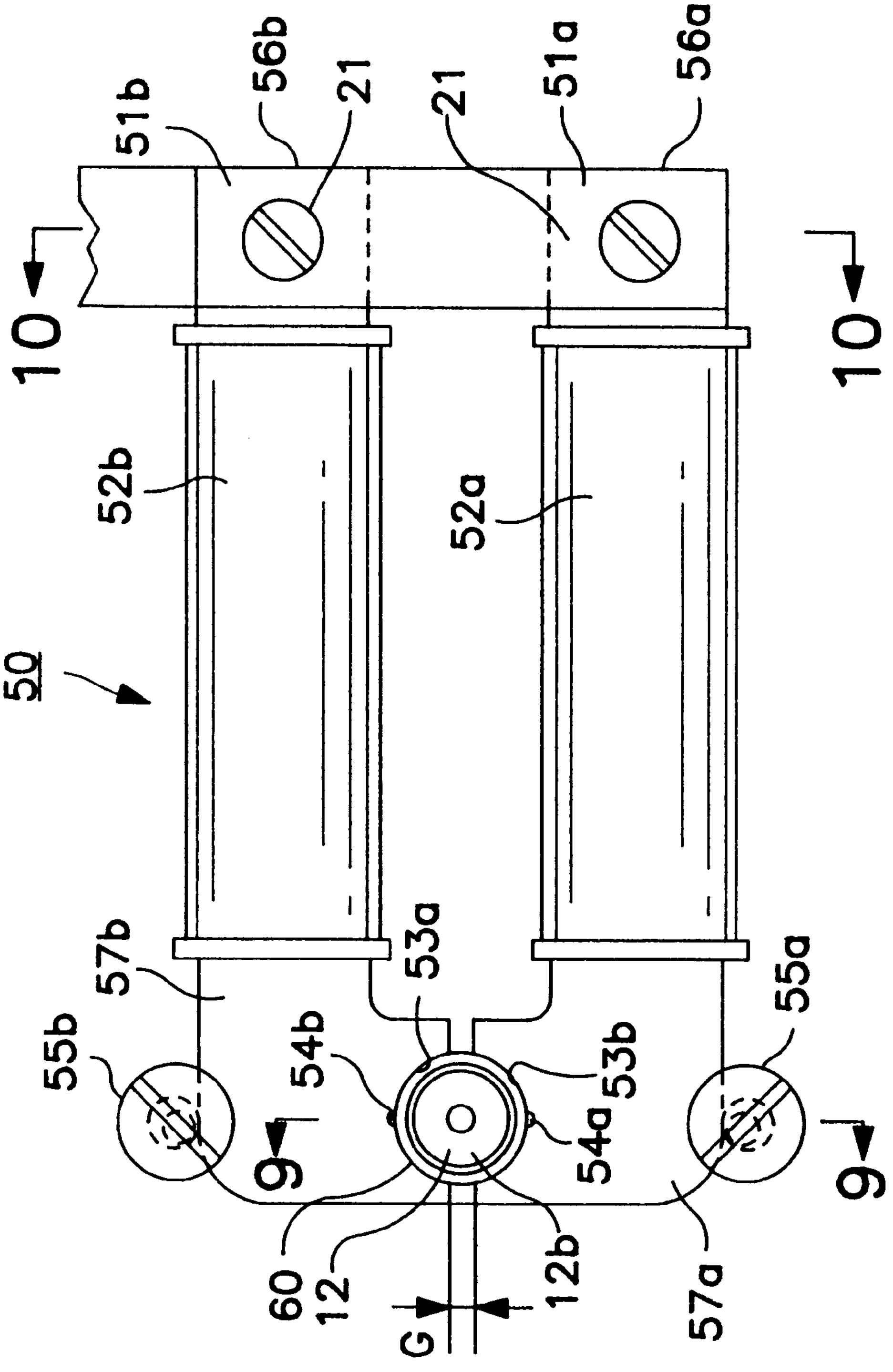
FIG. 8 is a top plan view of a generator constructed in accordance with a third embodiment of the present invention.
Figure 9A:
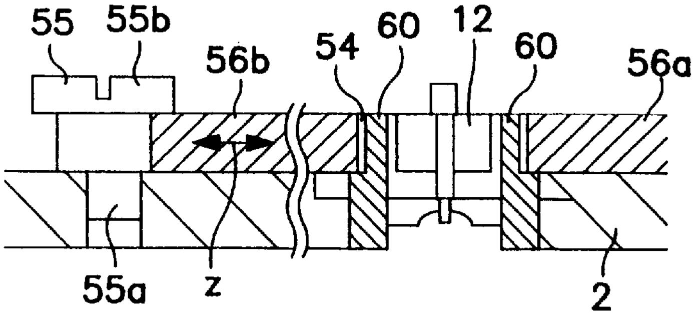
FIG. 9A is a sectional view taken along the line 9—9 of FIG. 8 wherein the positioning jig is provided with a flat-screw-shaped head.
Figure 9B:
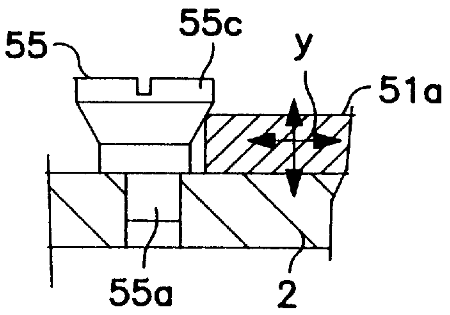
FIG. 9B is a sectional view taken along the line 9—9 of FIG. 8 wherein the positioning jig is provided with a coned-disc-screw-shaped head.
Figure 10:
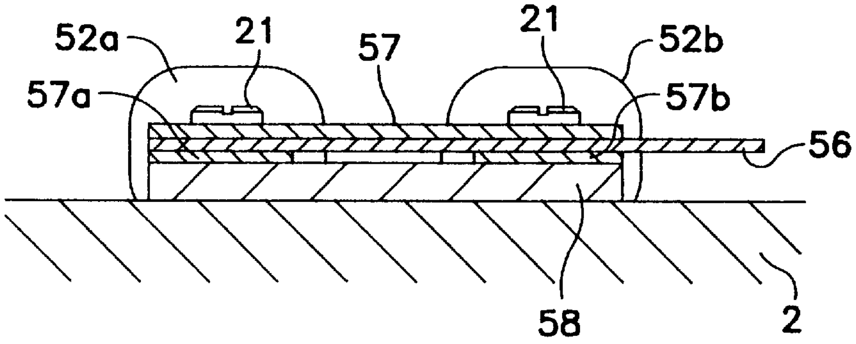
FIG. 10 is a sectional view taken along the line 10—10 of FIG. 8.

Reference is now made to FIG. 8–FIG. 10 which show a third embodiment of the present invention. In the figures, a generator 50 is composed of L-shaped stators 51*a*, 51*b* formed to the same shape, and coils 52*a*, 52*b* wound around the respective peripheries of stators 51*a* 51*b*. Both coils 52 have the same number of turns and are connected in series to each other. Semi-circular stator holes 53*a*, 53*b* are formed to the extreme ends 57*a*, 57*b* of respective stators 51*a*, 51*b*. Internal notches 54*a* 54*b* are formed in respective stator holes 53*a*, 53*b* at the positions thereof position 90 degrees from the gaps G, respectively.

A positioning member 60 is formed on the stator holes 53*a*, 53*b* side edge of extreme ends 57*a*, 57*b* on main plate 2 as shown in FIG. 9A. Positioning member 60 is ring shaped around stator holes 53*a*, 53*b*.

Alternatively, positioning jigs 55 are disposed on both sides of extreme ends 51*a* of stators 51 in place of fixing screws.

Positioning jig 55 is analogous to a screw and is rotatably supported by main plate 2 while deflecting its axial center 55*a*, as shown in FIG. 9A and FIG. 9B. In the type of the positioning jig 55 shown in FIG. 9A, when a small flat-screw-shaped head 55*b* is turned while pressing the upper surface of extreme ends 57*a*, 57*b* with it, extreme end 57*a* can be moved in the diameter direction of stator holes 53*a*, 53*b* as shown by arrow z. With this operation, extreme end 57*a* of stator 51 can be correctly and simply aligned by abutting stator 51 against positioning member 60.

Positioning jig 55 may be provided with a small coned-disc-screw-shaped head 55*c* as shown in FIG. 9(*b*). In this case, when head 55*c* is rotated while causing the upper surface corner of extreme end 51*a* to be in contact with the inclined surface thereof, not only is extreme end 57*a* moved in the diameter direction of the stator hole 53*a*, 53*b* as shown by arrow y and abutted against positioning members 60, but stator 51 is abutted against main plate 2 so that it can be aligned vertically.

The positioning jig 55 is composed of a plastic material which is softer than the material of the stator regardless of the arrangement thereof. When, for example, the positioning member is not provided, the positioning jigs 55 may be used for the fine adjustment of the position of the stators 51*a*, 51*b*. After the completion of the positioning, the stators 51 are fixed using the screws or the like of the above embodiment.

As shown in the sectional view of FIG. 10, an end of a circuit substrate 56 which is connected to the lead wires of the coils 52 is disposed on the rear end portions 51*b* of the stators 51, a circuit pressing plate 57 is disposed on the circuit substrate 56, a yoke 58 is disposed under the rear end portions 51*b* and the respective rear end portions 56*a*, 56*b* are fixed to the main plate 2 by screws 21 through the above members.

In addition to effects similar to the effects 1)–3), 6)–8) of the first and second embodiments, the third embodiment provides the following effects:

10) Positioning jigs 55 and positioning member 60 provide for the alignment of stators 51*a*, 51*b* in a state such that rotor 12 is disposed in stator holes 53*a*, 53*b*. Thus, the position of stators 51*a*, 51*b* can be most suitably set to rotor 12, for example, just before the product is shipped. Consequently, a positional accuracy can be enhanced.

11) By fixing the end of circuit substrate 56, circuit substrate 56 can be connected to the lead wires of the coils. The lead wires can be connected to an electronic circuit without soldering them, which is preferable as it helps save space.

12) Positioning jigs 55 are composed of a material such as plastic which is softer than the material of stators 51. Thus, stators 51 can be prevented from being damaged by positioning jigs 55.

13) The use of positioning jigs 55 having coned-disc-screw-shaped head 55*c* and the inclined surface helps press stators 51 against main plate 2. Consequently, the rattling of stators 51 can more reliably be prevented.

Figure 11:
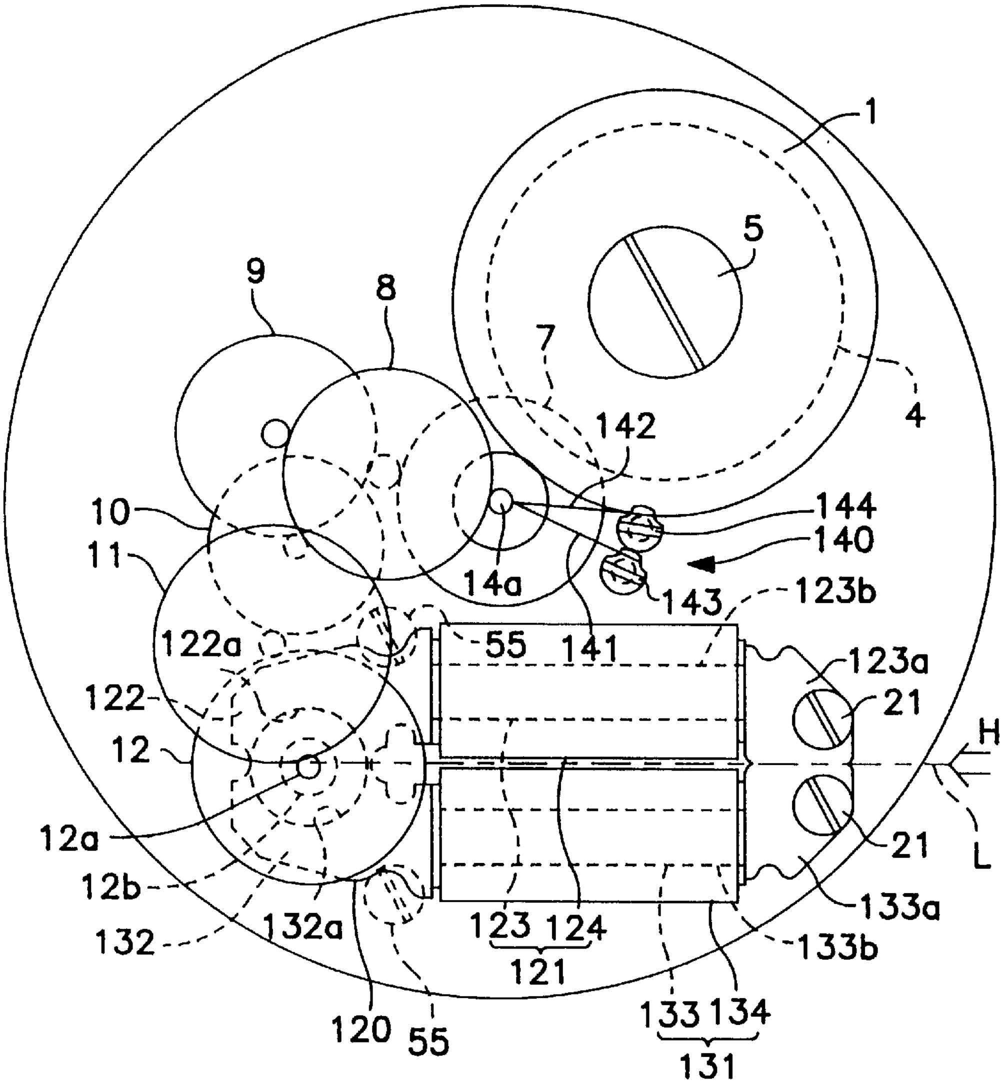
FIG. 11 is a top plan view showing a portion of an electronically controlled mechanical timepiece constructed in accordance with a fourth embodiment of the present invention.
Figure 12:
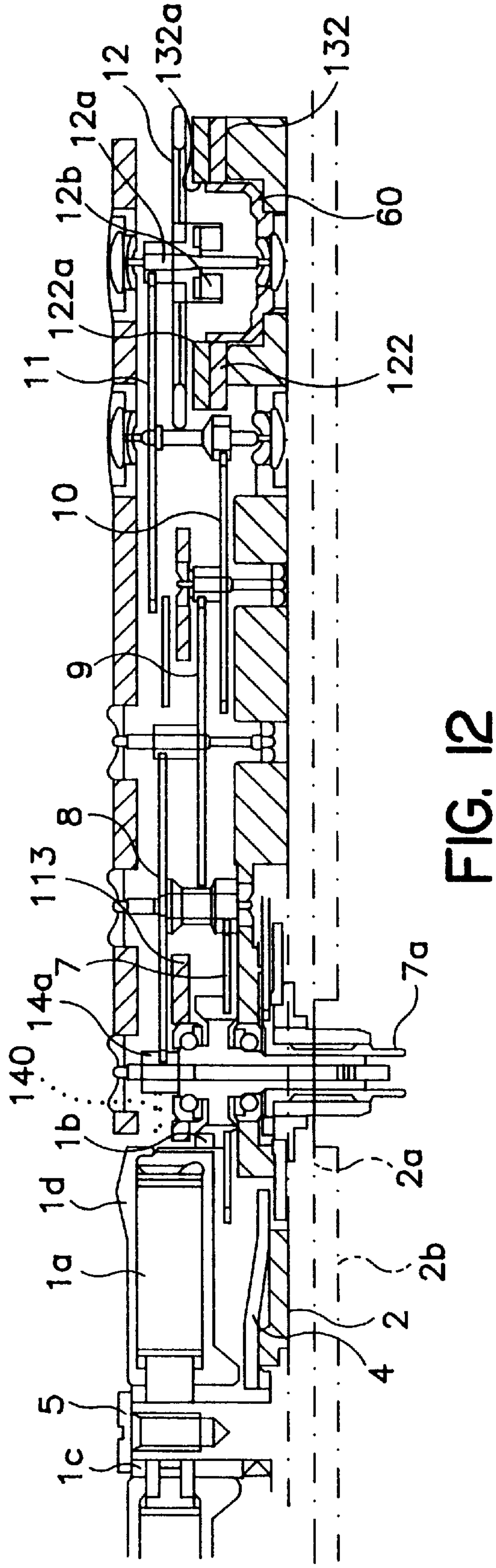
FIG. 12 is a sectional view of the electronically controlled mechanical timepiece constructed in accordance with the fourth embodiment of the present invention.
Figure 13:
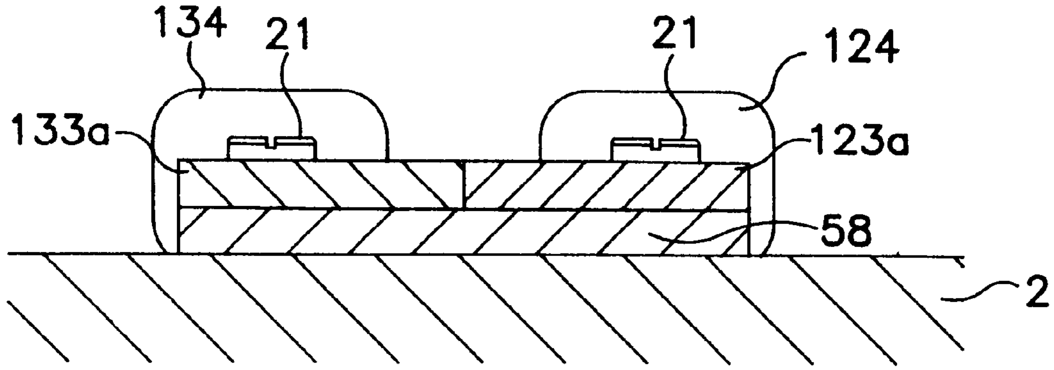
FIG. 13 is a sectional view of the generator constructed in accordance with a fourth embodiment of the present invention.

Reference is now made to FIGS. 11–13, which show an electronically controlled mechanical timepiece constructed in accordance with a fourth embodiment of the present invention. Parts similar or corresponding to those of the aforesaid embodiments are denoted by the same numerals and the description thereof is omitted or simplified.

The electronically controlled mechanical timepiece includes a main plate 2. A movement barrel 1 composed of a mainspring 1*a*, a barrel gear 1*b*, a barrel arbor 1*c* and a barrel lid 1*d* are mounted on main plate 1. Mainspring 1*a* has an outer end connected to barrel gear 1*b* and an inner end connected to barrel arbor 1*c*. Barrel arbor 1*c* is cylindrical in shape and is fixed by a ratchet wheel screw 5 inserted into a support member disposed on main plate 2. Barrel arbor 1*c* is rotated with a ratchet wheel 4. A calendar plate 2*a* and a dial 2*b* are also attached to main plate 2.

The rotation of barrel gear 1*b* is increased to 126,000 times the initial rotation thereof through respective wheels 7–11 serving as a speed increasing train wheel as described in the first embodiment above. Wheels 7–11 are disposed on a different axial line so that they do not overlap coils 124, 134 (which will be described later) and form a torque transmission path from mainspring 1*a*.

A minute hand (not shown) for displaying time is fixed to a canon pinion 7*a* rotatably mounted on main plate 2. Canon pinion 7*a* is engaged with second wheel 7. A second hand (not shown) for displaying time is fixed to a center second pinion 14*a*. Rotor 12 must be controlled to rotate at 5 rps in order to rotate the second wheel at 1 rpm and the center second pinion 14*a* at 1 rpm. This election of rotation requires barrel gear 1*b* to rotate at 1/7 rph.

A pointer restricting unit 140 mounted on main plate 2 restricts the backlash of center second pinion 14*a* located out of the torque transmission path. Pointer restricting unit 140 is interposed between movement barrel 1 and a coil 124. Pointer restricting unit 140 is composed of a pair of linear restricting springs 141, 142 subjected to surface processing using TEFLON®, inter-molecule-coupled film or the like and collets 143, 144. Collets 143, 144 act as fixing members which support the base ends of restricting springs 141, 142 and are fixed to a center wheel bridge 113.

The electronically controlled mechanical timepiece includes a generator 120 composed of rotor 12 and coil blocks 121, 131. Rotor 12 is composed of rotor pinion 12*a* and rotor magnet 12*b*.

Coil blocks 121, 131 are composed of stators (magnetic cores) 123, 133 and coils 124, 134 wound therearound. Stators 123, 133 are composed of core stator portions 122, 132 disposed adjacent to rotor 12, core winding portions 123*b*, 133*b* around which coils 124, 134 are wound and core magnetic conducting portions 123*a*, 133*a* which are connected to each other. All these components are integrally formed with each other.

Stators 123, 133 and coils 124, 134 are disposed in parallel with each other. Rotor 12 is disposed on the side of core stator portions 122, 132 such that the center axis thereof is located on a boundary line L which passes between coils 124, 134. Core stator portions 122, 132 are disposed on the right side and the left side respectively so as to be symmetrical with respect to boundary line L.

A positioning member 60 is disposed on stator holes 122*a*, 132*a* of stators 123, 133 where rotor 12 is disposed as shown in FIG. 12. Positioning jigs 55 each composed of a deflected pin are disposed to intermediate positions of stators 123, 133 in the lengthwise direction thereof, that is, disposed between core stator portions 122, 132 and core magnetic conducting portions 123*a*, 133*a*. The rotation of positioning jigs 55 causes core stator portions 122, 132 of stators 123, 133 to be abutted against positioning member 60 so that they can be correctly and simply aligned. The rotation of positioning jigs 55 also causes the sides of core magnetic conducting portions 123*a*, 133*a* to reliably come into contact with each other.

Coil 124 and coil 134 have the same number of turns. This same number of turns includes not only a case where the number of turns is perfectly the same but also a case where there is an error in the number of turns, such error being negligible from the number of turns of the coils as a whole such as, for example, several hundreds of turns.

The sides of core magnetic conducting portions 123*a*, 133*a* of stators 123, 133 are abutted against and connected to each other as shown in FIG. 13. Further, the lower surfaces of core magnetic conducting portions 123*a*, 133*a* are in contact with a yoke 58 disposed across them. With this arrangement, two magnetic conducting paths are formed. A first magnetic conducting path passing through the sides of core magnetic conducting portions 123*a*, 133*a* and a second magnetic conducting path passing through the lower surfaces of core magnetic conducting portions 123*a*, 133*a* and the yoke 58. Stators 123, 133 form an annular magnetic circuit. Coils 124, 134 are wound in the same direction from core magnetic conducting portions 123*a*, 133*a* of stators 123, 133 to core stator portions 122, 132.

The ends of coils 124, 134 are connected to a coil lead substrate (not shown) disposed on core magnetic conducting portions 123*a*, 133*a* of stators 123, 133.

In the use of the electronically controlled mechanical timepiece arranged as described above, when an external magnetic field H (see FIG. 11) is applied to coils 124, 134, it is oppositely applied to the winding directions of coils 124, 134 because it is applied to coils 124, 134 disposed in parallel with each other in the same direction.

In addition to effects similar to effects 1)–3), 6), 7), 10)–13) of the first, second and third embodiment, the fourth embodiment provides the following advantageous effects:

14) Second to sixth wheels 7–11 are disposed on a different axial line, respectively. The degree of freedom of design of wheels 7–11 can be increased. Thus, when wheels 7–11 are disposed so as to be roundabout toward rotor 12 by locating center second pinion 14*a* out of the torque transmission path, wheels 7–11 can be disposed at positions where they do not overlap coils 124, 134. Accordingly, since the number of turns can be increased by increasing the size of coils 124, 134 in a width direction, the length of coils 124, 134 in a flat surface direction, that is, the length of the magnetic path can be reduced. Consequently, the duration of mainspring 1*a* can be increased by reducing iron loss.

15) Rotor 12 is disposed on boundary line L and core stator portions 122, 132 are symmetrically disposed on the right side and the left side. Thus, the magnetic path of core stator portions 122, 132 can be shortened as compared with the first embodiment described above. The magnetic path can be also shortened in this respect so that the iron loss can be reduced.

16) Since the two magnetic conducting paths are formed to core magnetic conducting portions 123*a*, 133*a*, magnetic resistance can be reduced and stabilized. More specifically, although the fluxes in core magnetic conducting portions 123*a*, 133*a* are liable to flow in a side direction, the portion where the sides of core magnetic conducting portions 123*a*,

133*a* are in contact with each other is liable to be dispersed in its gap depending upon a product and there is a possibility that magnetic resistance will also be dispersed. On the other hand, when the magnetic conducting path is arranged through yoke 58 like the third embodiment, the flow of flux is difficult as compared with the side direction and consequently magnetic resistance cannot be much reduced. However, the dispersion of the gap can be reduced.

When the two magnetic conducting paths are formed as shown in the fourth embodiment, magnetic resistance can be reduced and stabilized. Since the stabilization of the magnetic resistance also stabilizes cogging torque, cogging torque can be reduced by the provision of internal notches corresponding to the torque. Further, generated voltage as well as power generation and braking can be stabilized. Moreover, leakage flux can be reduced, consequently reducing eddy loss in metal parts.

17) Since positioning jigs 55 are disposed between core stator portions 122, 132 and core magnetic conducting portions 123*a*, 133*a*, core stator portions 122, 132 can be aligned and the abutting state of core magnetic conducting portions 123*a*, 133*a* can be regulated by one of positioning jigs 55 for each of stators 123, 133. With this arrangement, the number of positioning jigs 55 can be reduced, thereby simplifying the arrangement of this embodiment. Moreover, the cost can also be reduced under this arrangement.

18) Since magnetic noise due to external magnetic field H can be reduced, it is not necessary to provide movement parts such as dial 2*b*, of the electronically controlled mechanical timepiece, with a magnetic resistant plate. A material having a magnetic resistant effect to exterior parts can be used. As a result, because the magnetic resistant plate and the like are not necessary, cost can be reduced. Moreover, the movement can be reduced in size and thickness as well. Accordingly, the degree of freedom of design is increased because the disposition and the like of the respective parts is not limited by the exterior parts. Consequently, an electronically controlled mechanical timepiece, which is excellent in design, manufacturing efficiency and the like, can more easily be provided.

19) Center second pinion 14*a* does not need a torque transmission gear and the like which overlap movement barrel 1 because it is located out of the torque transmitting path. Thus, the thickness of mainspring 1*a* can be increased and the duration of mainspring 1*a* can be more extended while the thickness of the clock as a whole is maintained.

Next, a fifth embodiment of the present invention will be described.

The fifth embodiment is characterized in that coils 33, 34, which are connected in series to each other in the first embodiment, are not connected to each other and are used for a different purpose. First coil 33 and second coil 34 are wound around stators 31, 32 in the fifth embodiment like the first embodiment. However, first coil 33 is used as a braking coil and second coil 34, which now has a larger number of turns, is used solely as a coil for generating power and detecting the rotation of rotor 12.

Figure 14:
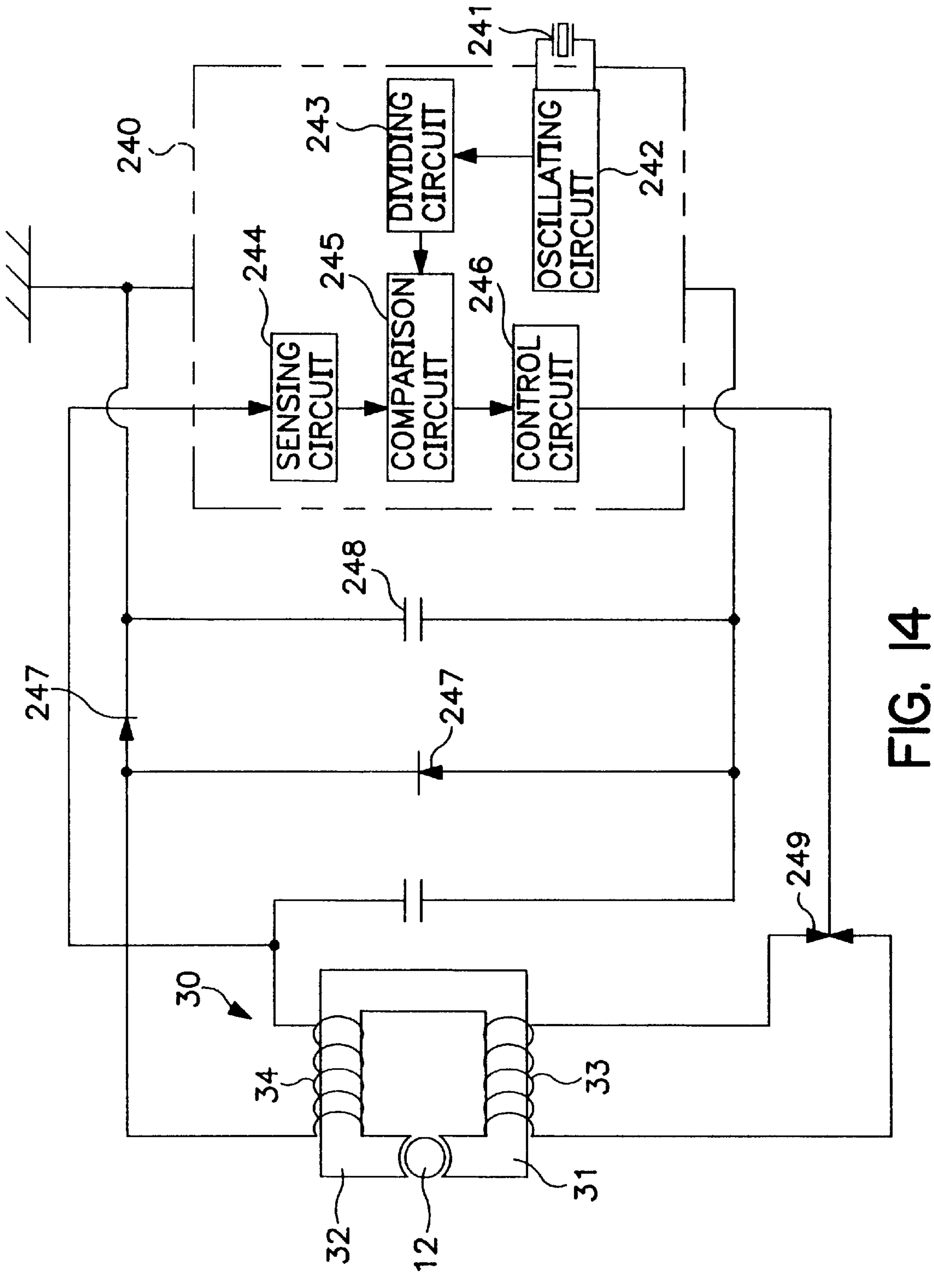
FIG. 14 is a circuit block diagram showing the generator and an electronic circuit constructed in accordance with a fifth embodiment of the present invention.

Reference is made to FIG. 14 which shows a circuit arrangement of the fifth embodiment. This circuit is similar to the circuit of FIG. 4, like numbers indicating like structures. An electronic circuit 240 composed of an IC includes an oscillating circuit 242 for driving a quartz oscillator 241, a dividing circuit 243 for producing a reference frequency signal serving as a time signal based on a clock signal generated by oscillating circuit 242, a sensing circuit 244 for detecting the rotation of rotor 12, a comparison circuit 245 for comparing the rotation cycle obtained by sensing circuit 244 with the reference frequency signal and outputting a difference therebetween, and a control circuit 246 for transmitting a control signal for controlling generator 30 in accordance with the difference. The clock signal may be generated using various types of a reference standard oscillation source in place of quartz oscillator 241.

Circuits 242–246 are driven by the power generated by second coil 34. When rotor 12 of generator 30 receives the rotation from a train wheel and is rotated in one direction, an AC output is generated to second coil 34, the output is boosted and rectified by a boosting/charging circuit composed of diodes 247 and capacitors 248. Control circuit (electronic circuit) 240 is driven by the rectified DC current.

A portion of the AC output from second coil 34 is taken out as a signal for detecting the rotation cycle of rotor 12 and input to sensing circuit 244. The waveform output from second coil 34 draws a correct sine wave for each rotation cycle as shown in FIG. 18(*a*). Therefore, sensing circuit 244 subjects the signal to A/D conversion and arranges it as a time series pulse signal. The detected signal is compared with the reference frequency signal by comparison circuit 245 and control circuit 246 transmits a control signal to a short-circuit circuit 249 which acts as the brake circuit for first coil 33 in accordance with the difference between the detected signal and the reference frequency signal.

Short-circuit circuit 249 short-circuits both the ends of first coil 33 based on the control signal from control circuit 246 and applies a short-circuit brake to coil 33 to thereby regulate the rotation cycle of rotor 12.

The fifth embodiment provides the following effects in addition to advantageous effects similar to those obtained by the above-discussed first, second, third and fourth embodiments:

20) Since the functions of coils 33, 34 wound around stators 31, 32 are perfectly separately set, first coil 33 is used only as a brake control and second coil 34 is used only to generate power and detect rotation. The voltage generated by the second coil is not affected by an electromagnetic brake. Thus, the generated voltage can be stabilized and the power generating efficiency can be improved.

21) The output from second coil 34 is not affected by the electromagnetic brake. Thus, a sine wave which does not have disturbance in each cycle and is more accurate than that of the above embodiments can be produced as an output. An output waveform can be easily detected by converting the sine wave to a binary value by dividing it by a proper threshold value. Consequently, the number of rotation of rotor 12 and the like can be easily detected. Therefore, the clock making use of the output waveform of generator 30 can be correctly and simply controlled.

Figure 15:
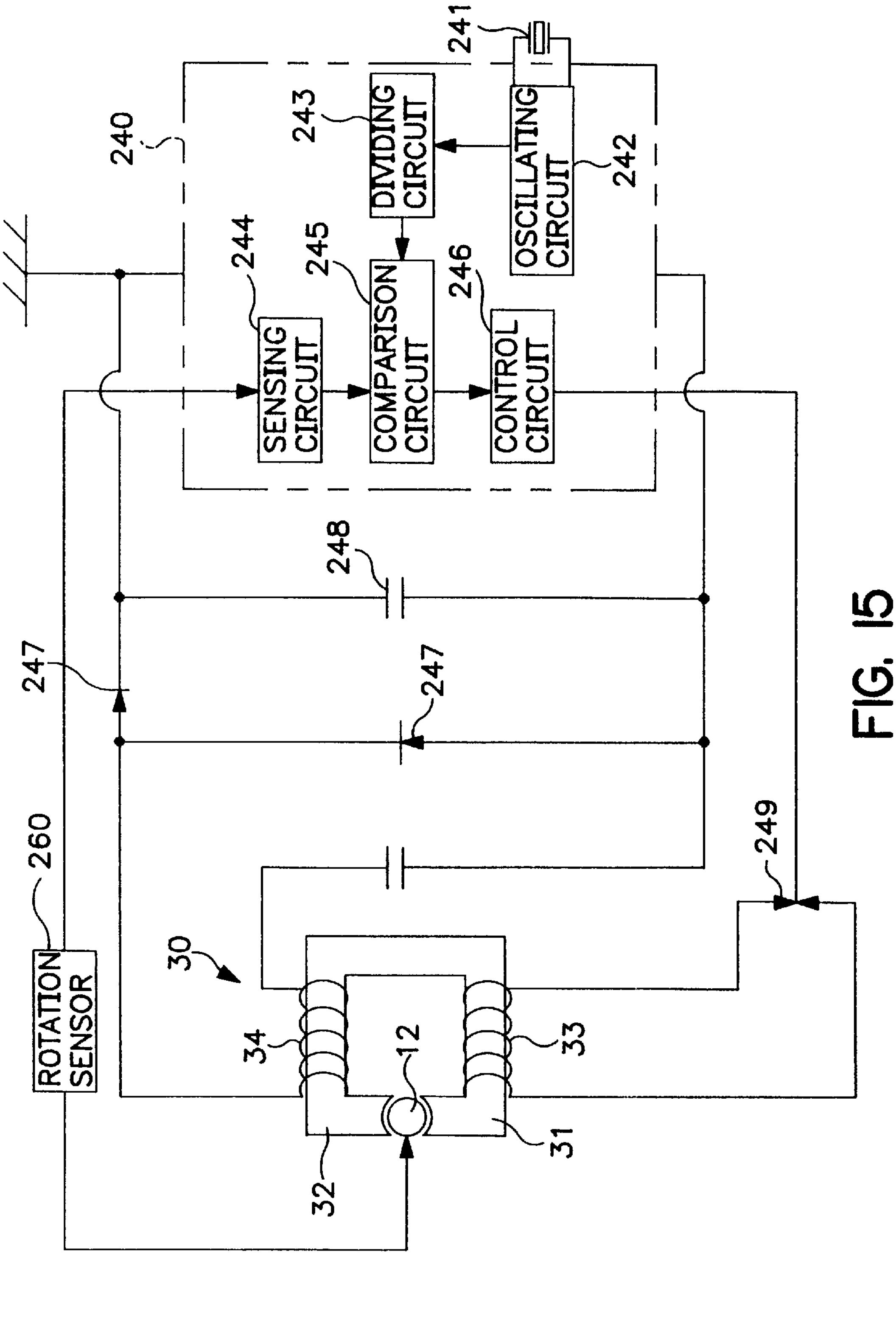
FIG. 15 is a circuit block diagram showing the generator and an electronic circuit constructed in accordance with a sixth embodiment of the present invention to an electronic circuit.

FIG. 15 shows a sixth embodiment of the present invention. Parts similar to those of the fifth embodiment are denoted by the same numerals and only different parts will be described with reference to different numerals denoting them.

The sixth embodiment is arranged similarly to the fifth embodiment except that it is provided with a rotation sensor 260 for detecting the rotation of a rotor 12 instead of the detection of the waveform of an AC output. A value detected by rotation sensor 260 is input to a detecting circuit 244. Various types of sensors, such as an optical sensor, may be used as rotation sensor 260 so long as they can detect the rotation of rotor 12.

The sixth embodiment uses the output from a coil 34 only as a power source for driving an electronic circuit 240.

The sixth embodiment provides the following advantageous effect in addition to an effect similar to the effect 20) of the fifth embodiment.

22) Since second coil 34 is used only to generate power, there is an advantage that the power generating efficiency can be improved.

However, the fifth embodiment is more advantageous than the sixth embodiment in cost and structure because the sixth embodiment needs rotation sensor 260.

Figure 19:
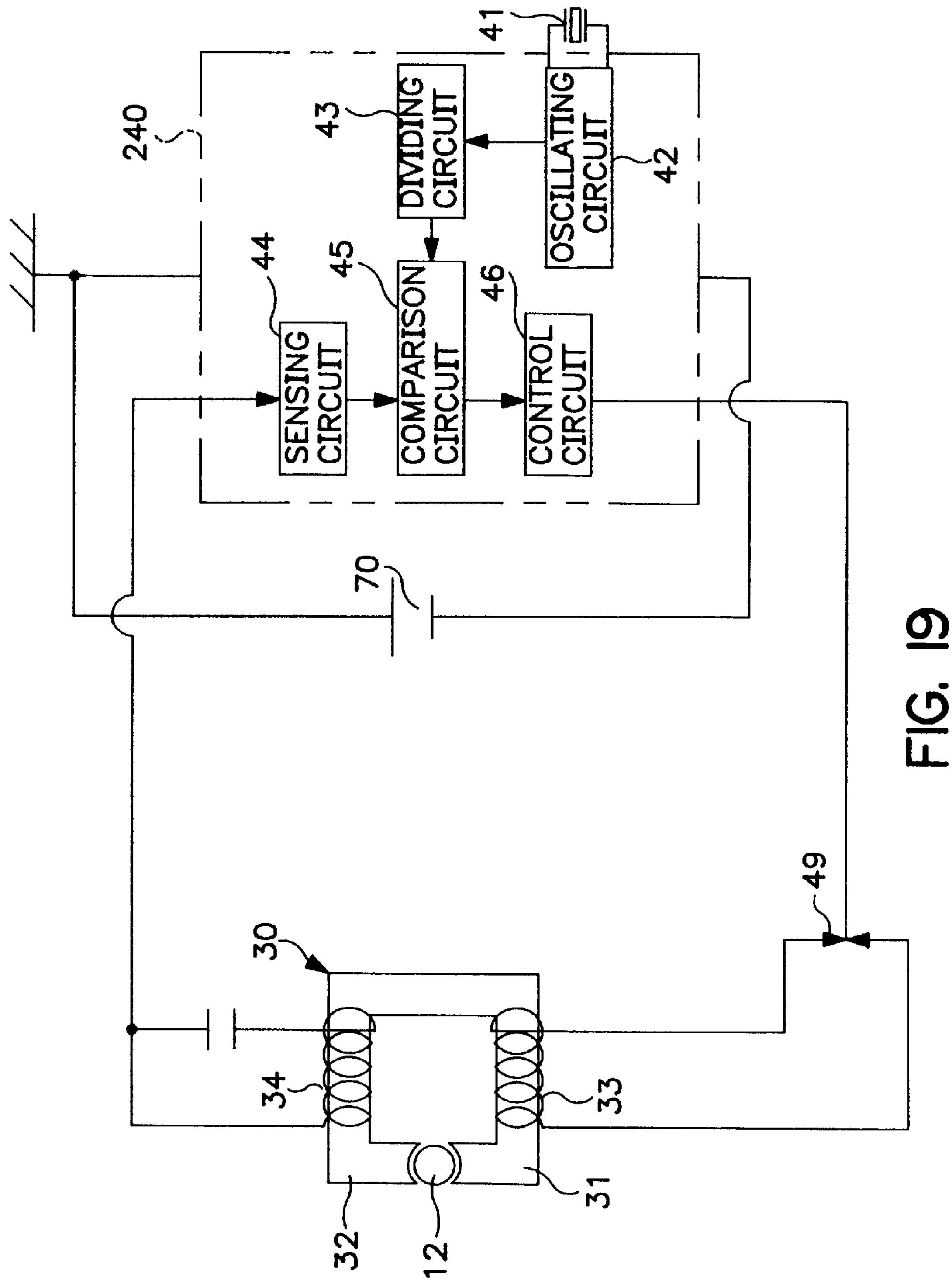
FIG. 19 is a circuit block diagram of a generator and electronic circuit constructed in accordance with a seventh embodiment of the present invention.

Reference is now made to FIG. 19 which shows a seventh embodiment of the present invention. Since this embodiment is also similar to the first embodiment shown in FIGS. 1–3, the same components are denoted by the same numerals and the description thereof is omitted and only different components are described using different numerals.

In the seventh embodiment, a second coil 34 is connected only to a second sensing circuit 44 and used only to detect the rotation of a rotor. A battery 70 is coupled across electronic circuit 240. Thus, an electronic circuit 240 is driven by a battery 70. A battery which need not be replaced, such as a solar battery, a piezoelectric device, a thermo-power generating device or the like may be used as battery 70, although an ordinary button-type battery which must be replaced may also be used.

In addition to effects similar to the effects 1)–5) of the first embodiment, this embodiment provides an advantageous effect 23) that since second coil 34 is solely used to detect the rotation of rotor 12 and need not generate power for driving electronic circuit 240, the number of turns of the coil is reduced and a generator 30 can therefore be decreased in size.

The present invention is not limited to the aforesaid embodiments and includes modifications, improvements and the like within the range where they can achieve the object of the present invention.

For example, although coils 42, 52 and 124, 134 of two stators 41, 51 and 123, 133 are wound in the same number of turns in the embodiments 2–4, they may be wound in a different number of turns. However, the same number of turns is preferable because the external noise can be cancelled.

When stators 31, 32 have a different shape as shown in the first embodiment, the affect of the external noise may be cancelled by properly setting the number of turns of coils 33, 34 in accordance with the shape of stators 31, 32.

When coils 33, 34 are not connected in series to each other and the functions thereof are separately set as shown in the fifth and sixth embodiments, the number of turns of coils 33, 34 may be set in accordance with their functions.

Although the coils are wound around two stators 31, 32, 41, 51, and 123, 133, respectively in the above embodiments, the coil may be wound around each one of stators 31, 32, 41, 51, and 123, 133. The number of turns and the like of the coil may be suitably set in accordance with a power generating capability and the like needed by the electronically controlled mechanical timepiece.

When the internal notch is formed on the stator hole, the two internal notches in total are formed to the confronting positions of the stator hole in the second and third embodiments. However, only one internal notch may be formed on the stator hole. When only one internal notch is formed, the affect of dispersion of the notch caused in a manufacturing process can be reduced because the notch can be formed in a larger size. Alternatively, when the two internal notches are formed as shown in the above embodiments, the stator can be formed to a symmetrical shape and arranged as the same part. Therefore, the number of different kinds of parts can be reduced and consequently the manufacturing cost can be reduced. Although the positions of the internal notches are not limited to the positioned 90° from the gap positions, it is preferable to locate them at the above positions because the positions most effectively reduce cogging torque. In addition, the shape and the like of the stators may be suitably set when they are manufactured.

As described above, according to the electronically controlled mechanical timepiece of the present invention, the two stators are combined and the stator hole is divided into the two portions. Accordingly, difficulty in handling and a drop in a yield which are caused by the provision of external notches which are a defect of a conventional integrally formed stator hole can be prevented. In addition, an increase in a generated voltage is advantageous for the drive of the electronic control circuit. Further, since the waveform of the voltage is made to a sine wave, rotation can be easily detected and the control system can be easily arranged.

It will thus be seen that the objects set forth above, among those made apparent from the preceding description, are efficiently attained and, since certain changes may be made in carrying out the above process and in the construction set forth without departing from the spirit and scope of the invention, it is intended that all matter contained in the above description and shown in the accompanying drawings shall be interpreted as illustrative and not in a limiting sense.

It is also to be noted that the following claims are intended to cover all of the generic and specific features of the invention herein described and all statements of the scope of the invention which, as a matter of language, might be said to fall therebetween.

What is claimed is:

1. A timepiece, comprising:

a mechanical energy source;

a generator including:

- a rotor;
- a first plate-shaped stator having a first end;
- a second plate-shaped stator having a first end;
- a pair of substantially semi-circular stator holes formed in said first end of each of said first and said second stator, said stators being disposed to position said semicircular stator holes around said rotor in the form of a circle;
- at least a first coil wound around the periphery of at least one of said first and second stators;

a train wheel connecting said mechanical energy source to said rotor, said mechanical energy source driving said train wheel to cause rotation of said rotor, said generator converting rotation into electrical power; and an electronic circuit driven by said electrical power to control the rotation cycle of said rotor.

2. The timepiece of claim 1, comprising a brake coupled to said electronic circuit to brake said train wheel in response to the rotation cycle of said rotor.

3. The timepiece of claim 1, comprising at least a second coil wherein said first and said second coils are wound around a respective periphery of one of said first and second stators; said first coil and said second coil being connected in series.

4. The timepiece of claim 1, wherein said first coil is wound around the periphery of said first stator, generates electromotive force and controls the rotation of said rotor.

5. The timepiece of claim 1, wherein at least one coil is wound around a periphery of said first stator and at least one coil is wound around a periphery of said second stator, at least one of said first coil and said second coil controlling the rotation of said rotor and at least one of said first coil and said second coil being used to generate electromotive force to be supplied to said electronic circuit.

6. The timepiece of claim 5, wherein at least one of said first coil and said second coil used to generate said electromotive force detects the rotation of said rotor.

7. The timepiece of claim 1, comprising:

a positioning member abutting against the edges of both said first stator and said second stator on the stator hole end thereof; and positioning jigs for pressing said first stator and said second stator against said positioning member and abutting said first stator and said second stator thereagainst.

8. The timepiece of claim 7, wherein said first and second stators each have an edge, and said positioning jigs have inclined surfaces for obliquely pressing against the edges of said respective stators so that said stators are positioned in a height direction by said inclined surfaces.

9. The timepiece of claim 1, wherein each stator has a central axis and each stator is symmetrical in shape about the central axis.

10. The timepiece of claim 1, comprising at least a second coil wound about said second stator, and wherein the number of turns of said first coil is substantially equal to the number of turns of said second coil.

11. The timepiece of claim 1, comprising at least one confronting position on the inner periphery of said stator holes having an internal notch, said internal notch projecting toward the outside of said stator hole to regulate cogging torque.

12. The timepiece of claim 1, comprising a yoke disposed across said stators, wherein each of said stators has a second end which is opposite to said first end thereof, said second ends of each of said first and second stators abutting against each other, and the lower surfaces of the respective second ends abutting against said yoke.

13. The timepiece of claim 1, wherein said train wheel includes at least two wheels, said wheels being disposed at positions that do not overlap axially with said at least first coil.

* * * * *